United States Patent
Kurosawa et al.

(10) Patent No.: US 10,784,801 B2
(45) Date of Patent: Sep. 22, 2020

(54) MOTOR DRIVING APPARATUS AND MOTOR SYSTEM

(71) Applicant: RENESAS ELECTRONICS CORPORATION, Tokyo (JP)

(72) Inventors: Minoru Kurosawa, Tokyo (JP); Kichiya Itagaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/400,946

(22) Filed: May 1, 2019

(65) Prior Publication Data

US 2019/0348935 A1 Nov. 14, 2019

(30) Foreign Application Priority Data

May 14, 2018 (JP) .................... 2018-092980

(51) Int. Cl.
*H02P 6/182* (2016.01)
*H02P 21/22* (2016.01)
*H02K 5/24* (2006.01)

(52) U.S. Cl.
CPC ............ *H02P 6/182* (2013.01); *H02K 5/24* (2013.01); *H02P 21/22* (2016.02)

(58) Field of Classification Search
CPC ............ H02P 6/182; H02P 21/22; H02K 5/24
USPC ............... 318/400.13, 400.01, 700
See application file for complete search history.

(56) References Cited

U.S. PATENT DOCUMENTS 10,581,364 B2 * 3/2020 Kurosawa ............. H02P 6/182
2017/0126155 A1 5/2017 Kurosawa et al.

FOREIGN PATENT DOCUMENTS

JP 2003-111485 A 4/2003
JP 2017-085799 A 5/2017

* cited by examiner

*Primary Examiner* — David Luo
(74) *Attorney, Agent, or Firm* — McDermott Will & Emery LLP

(57) ABSTRACT

The phase error detection unit PHED detects the phase error PERR between the phase of the BEMF and the phase of the phase switching signal COMM (masking signal MSK) at each of a plurality of detection timings that become the zero crossing timings of the BEMF in the mechanical angular cycle. The PI compensator PICPa has a plurality of cycle setting registers REGN 0_0 to REGN 3_5 for each of a plurality of detection timings, and while switching the registers for each detection timing, the PI compensator determines the cycle setting value NCNTS for bringing the inputted phase error PERR close to zero by reflecting the previous cycle setting value NCNT stored in the register. The clock generation unit CGEN sequentially controls the phase switching signal COMM based on the cycle setting value NCNTS.

20 Claims, 25 Drawing Sheets

MOTOR DRIVING APPARATUS AND MOTOR SYSTEM

CROSS-REFERENCE TO RELATED APPLICATIONS

The disclosure of Japanese Patent Application No. 2018-092980 filed on May 14, 2018 including the specification, drawings and abstract is incorporated herein by reference in its entirety.

BACKGROUND

The present invention relates to a motor driving apparatus and a motor system, and, for example, to a technique for controlling the conduction timing of a motor.

Japanese unexamined Patent Application publications No. 2003-111485 discloses a motor driving control circuit including a current control loop for controlling a motor current and a PLL control loop for determining an conduction timing of the motor. In order to generate the conduction timing synchronized with the back electromotive force (BEMF) by using the PLL control loop, a masking period (non-conduction period) reflecting the conduction timing is provided in a predetermined phase. The PLL control loop detects the zero crossing timing of the back electromotive force while observing the back electromotive force of a predetermined phase in the masking period, and updates the conduction timing so that the zero crossing timing is maintained at the center of the masking period.

Japanese unexamined Patent Application publications No. 2017-85799 discloses a motor driving apparatus for driving a three-phase motor with a sinusoidal wave. The motor driving apparatus divides one cycle of the sinusoidal wave (360 degrees electrical angular) into every 60 deg, fixes the terminal voltage of one phase in the three phases to the power supply voltage or the ground power supply voltage in each period, and controls the terminal voltages of the remaining two phases by the PWM signal.

SUMMARY

For example, in a motor system such as a hard disk drive (abbreviated as HDD in this specification), it is required to reduce the rotational jitter of the motor in order to improve the recording density in accordance with the increase in capacity. In order to reduce the rotational jitter, it is necessary to detect the position of the motor with high accuracy (and thus to generate high-accuracy conduction timing based on the detected position). For example, as a method of detecting the position of the sensorless motor, a method of detecting the zero crossing timing of the back electromotive force within the masking period is known as disclosed in Japanese unexamined Patent Application publications No. 2003-111485.

The position of the motor is normally detected at a plurality of detection timings within the mechanical angle of 360° and the motor driving apparatus generates, for example, the conduction timing synchronized with the plurality of detection timings by PLL (Phase Locked Loop) control or the like. However, in an actual motor, various manufacturing variations such as, for example, variations in the position of the magnetic pole of the rotor, variations in the mounting position of the stator or the position sensor, and the like occur. As a result, variations in the detection timings may occur, which will be referred to as magnetization variations in the present specification. Since the variation in magnetization causes an error in the conduction timing via PLL control or the like, it may become a factor for increasing the rotational jitter.

The embodiments described below have been made in view of the above, and other problems and novel features will be apparent from the description of the present specification and the accompanying drawings.

The motor driving apparatus according to the embodiment includes a phase error detecting unit, a compensator, and an conduction timing generating unit, and controls the targeted rotational phase for control so that the detected rotational phase obtained by detecting the rotational phase of the three-phase motor and the targeted rotational phase for control for determining the conduction timing of the three-phase motor are synchronized. The phase error detection unit detects a phase error between the detected rotation phase and the targeted rotational phase for control at each of a plurality of detection timings in the mechanical angular cycle of the three-phase motor. The compensator has a plurality of registers respectively corresponding to a plurality of detection timings, and uses the detected phase error as an input, determines an amount of operation for bringing the phase error close to zero by reflecting the previous state variable, and updates the state variable. The conduction timing generation unit sequentially controls the targeted rotational phase for control based on the determined amount of operation. Here, the compensator stores the state variable in a corresponding one register for each of a plurality of detection timings in the previous mechanical angular cycle, and determines the amount of operation in the current mechanical angular cycle by reflecting the state variable stored in the corresponding one register for each of a plurality of detection timings in the current mechanical angular cycle.

According to the above-mentioned embodiment, it is possible to reduce the rotational jitter even when the magnetization variation occurs in the motor.

DETAILED DESCRIPTION

Figure 1:
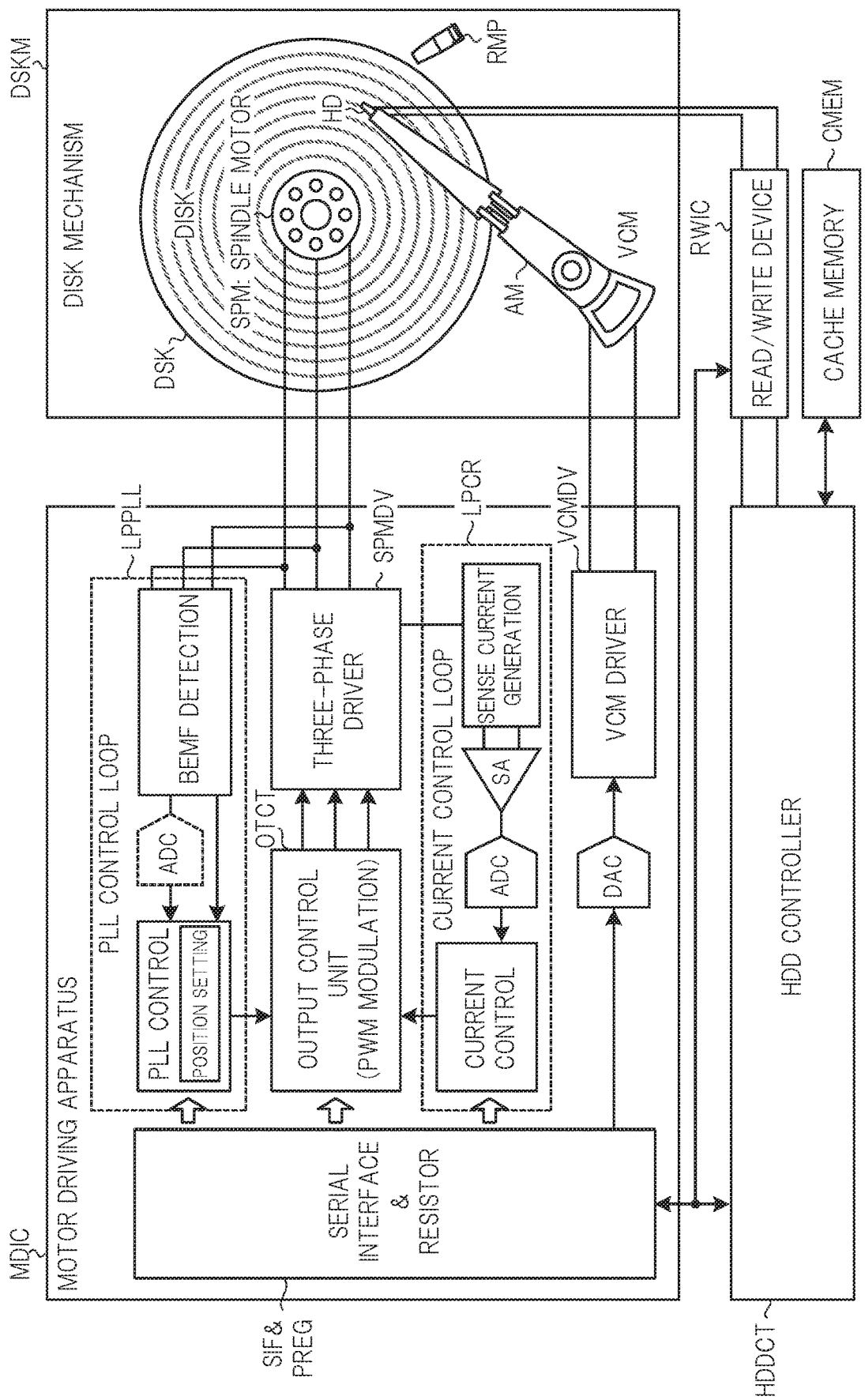
FIG. 1 is a block diagram illustrating a schematic configuration example of a motor system according to one embodiment of the present invention.

In the following embodiments, when it is necessary for convenience, the description will be made by dividing into a plurality of sections or embodiments, but except for the case where it is specifically specified, they are not independent of each other, and one of them is related to some or all of modifications, details, supplementary description, and the like of the other. In the following embodiments, the number of elements, etc. (including the number of elements, numerical values, quantities, ranges, etc.) is not limited to the specific number, but may be more than or less than a specific number, except for cases where the number is specifically indicated or is clearly limited to the specific number in principle.

Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

The circuit elements constituting the functional blocks of the embodiment are not particularly limited but are formed on a semiconductor substrate such as a single-crystal silicon substrate by an integrated circuit technique such as a well-known complementary MOS transistor (CMOS).

In all the drawings for explaining the embodiments, the same members are denoted by the same reference numerals in principle, and repetitive descriptions thereof are omitted.

First Embodiment

FIG. 1 is a block diagram showing a schematic configuration example of a motor system according to Embodiment 1 of the present invention. FIG. 1 shows a configuration example of a hard disk drive (HDD) device as an example of a motor system. The HDD device of FIG. 1 includes an HDD controller HDDCT, a cache memory CMEM, a read/write device RWIC, a motor driving apparatus MDIC, and a disc mechanism DSKM. The HDD controller HDDCT includes, for example, a system-on-chip (SoC) including a processor or the like. The cache memory CMEM and the read/write device RWIC are composed of, for example, different semiconductor chips.

The disk mechanism DSKM includes a disk (here, a hard disk) DSK, a three-phase spindle motor (hereinafter, referred to as a three-phase motor) SPM, a head HD, an arm mechanism AM, a voice coil motor VCM, and a ramp mechanism RMP. The three-phase motor SPM rotationally drives the disk DSK. The voice coil motor VCM controls the position of the head HD in the radial direction of the disk DSK via the arm mechanism AM. The head HD reads and writes data from and to the disk DSK at a predetermined position determined by the voice coil motor VCM. The ramp mechanism RMP serves as an evacuation location of the head HD when data reading and writing are not executed.

The motor driving apparatus MDIC is composed of, for example, one semiconductor chip. The motor driving apparatus MDIC comprises a digital-to-analog converter DAC and a VCM driver VCMDV for driving the voice coil motor VCM. The motor driving apparatus MDIC includes a PLL control loop LPPLL, a current control loop LPCR, a power controller OTCT, and a three-phase driver SPMDV for driving the three-phase motor SPM. Further, the motor driving apparatus MDIC includes a serial interface SIF and a parameter setting register PREG for setting driving conditions of the three-phase motor SPM and the voice coil motor VCM.

The PLL control loop LPPLL detects the position (rotational phase) of the three-phase motor SPM by detecting the back electromotive force of the three-phase motor SPM (also referred to as BEMF in the specification) and generates the conduction timing synchronized with the BEMF by using the PLL control. The current control loop LPCR detects a current flowing through the three-phase driver SPMDV by using a sense current generation circuit, sense amplifiers SAs, analog-to-digital converters ADCs, and the like, and calculates an error between the detected current and a current instruction value set in the parameter setting register PREG. The current control loop LPCR determines, for each PWM cycle, a PWM (Pulse Width Modulation) duty for generating sinusoidal wave voltages (sinusoidal wave currents) having amplitudes reflecting the calculated error and the sinusoidal wave pattern data to be incorporated in advance, based on the calculated error and the sinusoidal wave pattern data.

The power control unit OTCT generates a three-phase PWM signal based on the PWM duty from the current control loop LPCR and uses the three-phase PWM signal to switch and control the three-phase driver SPMDV at an appropriate timing based on the conduction timing from the PLL control loop LPPLL. As a result, the three-phase motor SPM is driven by a three-phase sinusoidal current synchronized with the BEMF of the three-phase motor SPM.

The read/write device RWIC drives the head HD and causes the head HD to read and write data. The HDD controller HDDCT controls the entire HDD controller. For example, the HDD controller HDDCT communicates with the motor driving apparatus MDIC via the serial interface SIF to instruct the motor driving apparatus MDIC to drive the three-phase motor SPM and the voice coil motor VCM. The driving condition includes a current indication for the current control loop LPCR. The HDD controller HDDCT instructs the read/write device RWIC to read/write data. At this time, write data instructed to the read/write device RWIC and data read from the head HD via the read/write device RWIC are held in the cache memory CMEM.

Next, the overall operation of the HDD device will be briefly described. When the motor driving apparatus MDIC receives the start command of the three-phase motor SPM from the HDD controller HDDCT, the three-phase motor SPM (i.e., the disc DSK) is controlled to reach the steady-state rotation at the target rotation speed while increasing the rotation speed stepwise. In the steady-state rotation, the three-phase motor SPM is driven by a three-phase sinusoidal current. In this case, the amplitudes and phases of the sinusoidal currents are controlled by the current control loop LPCR and the PLL control loop LPPLL, respectively. After the three-phase motor SPM reaches the steady-state rotation, the VCM driver VCMDV moves the head HD onto the disk DSK, and the head HD reads and writes data on the disk DSK.

In such a motor system, in addition to high efficiency, reduction of rotational jitter is required. In particular, in the HDD device, the recording density can be improved by reducing the rotational jitter when servo information is written, and thus the capacity can be increased. In order to reduce the rotational jitter, it is necessary to detect the position of the three-phase motor SPM with high accuracy and drive the three-phase motor SPM at high-precision conduction timing in synchronization with the position.

Therefore, the PLL control loop LPPLL detects the zero crossing timing of the BEMF with high accuracy by using the analog-to-digital converter ADC, and generates the conduction timing synchronized with the BEMF by the PLL control. At this time, the PLL control loop LPPLL is provided with a position setting unit, which will be described later in detail, in order to generate high-precision conduction timings synchronized with the BEMF even when magnetization variation occurs. Note that the analog-to-digital converter ADC in the PLL control loop LPPLL may be shared with the analog-to-digital converter ADC in the current control loop LPCR to reduce the circuitry size.

Figure 17:
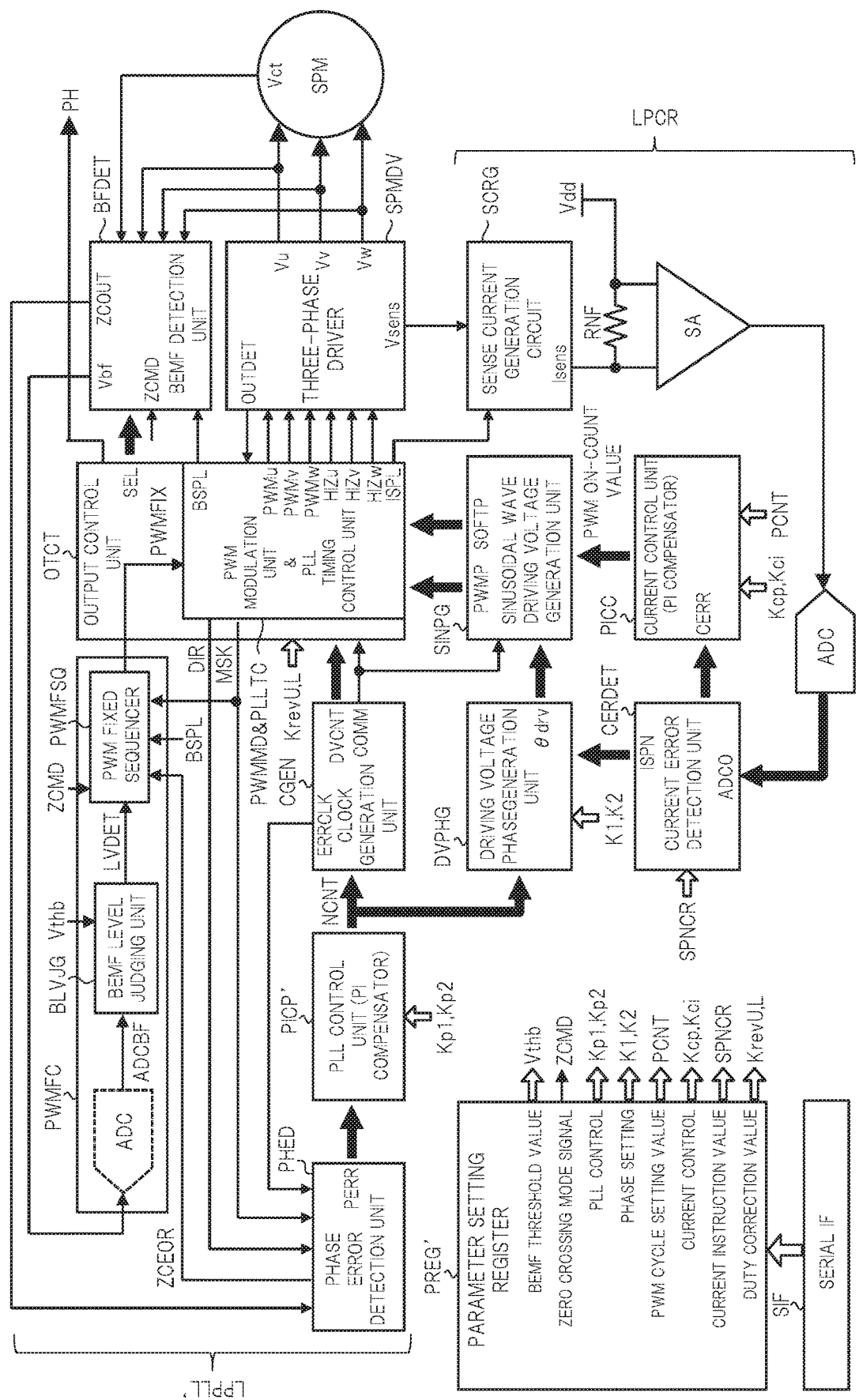
FIG. 17 is a block diagram illustrating a schematic configuration example of a motor driving apparatus that is a comparative example of the present invention.
Figure 18:
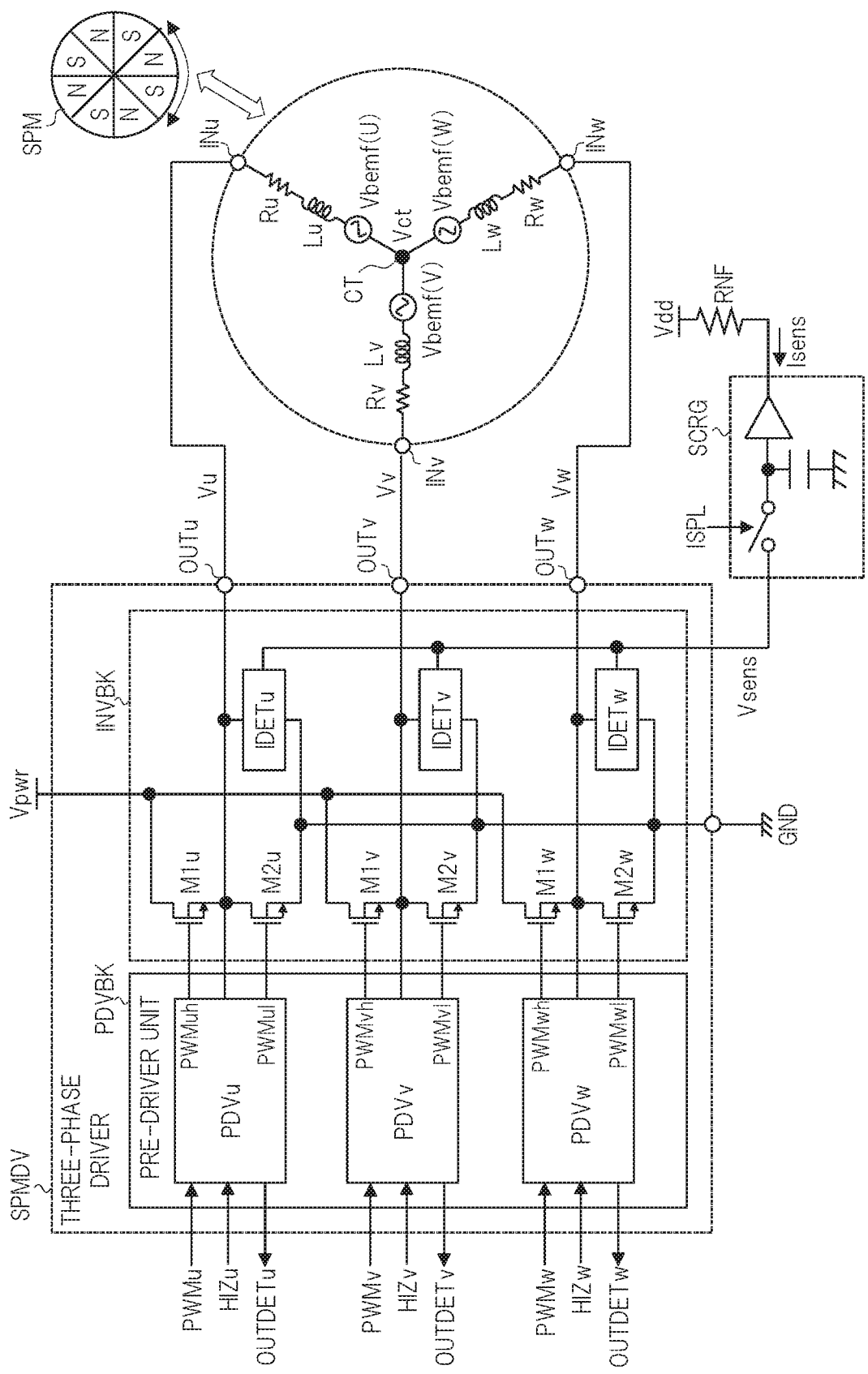
FIG. 18 is a circuit diagram illustrating an example of a configuration around a three-phase driver in FIG. 17.
Figure 19:
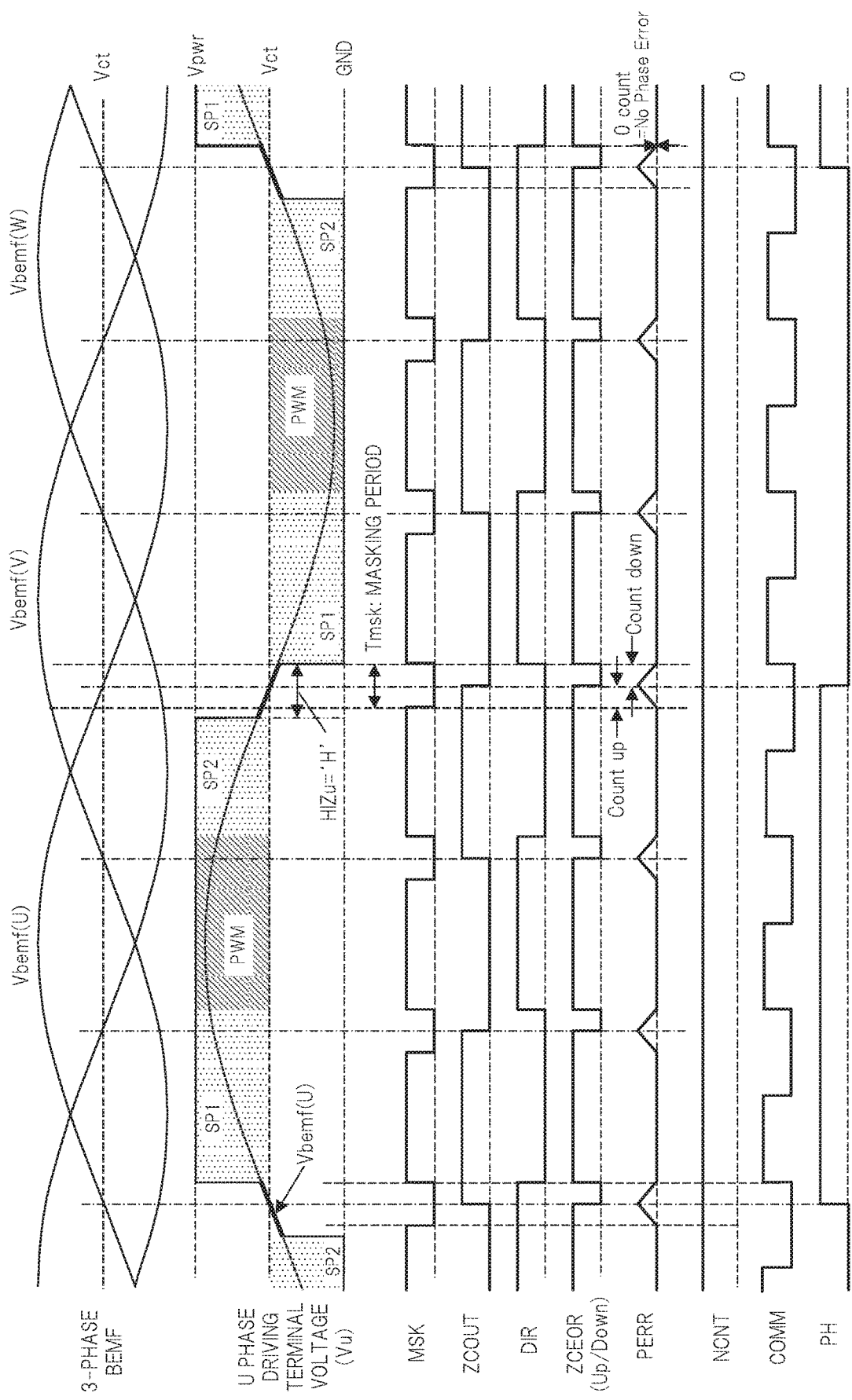
FIG. 19 is a timing chart illustrating an example of operation in an ideal state in the motor driving apparatus in FIG. 17.

Prior to the description of the motor driving apparatus of the embodiment, the configuration and operation of the motor driving apparatus as a comparative example will be described. FIG. 17 is a block diagram showing a schematic configuration example of a motor driving apparatus as a comparative example of the present invention. FIG. 18 is a circuit diagram showing a configuration example around the three-phase driver in FIG. 17. FIG. 19 is a timing chart showing an operation example in an ideal state in the motor driving apparatus of FIG. 17.

As shown in FIG. 1, the motor driving apparatus shown in FIG. 17 includes a PLL control loop LPPLL', a current control loop LPCR, a power control unit OTCT, a three-phase driver SPMDV, a serial interface SIF, and a parameter setting register PREG'. As shown in FIG. 18, the three-phase driver SPMDV includes a pre-driver unit PDVBK and an inverters unit INVBK. The inverters INVBK include three-phase high-side transistors M 1 $u$, M 1 $v$, and M 1 $w$, low-side transistors M 2 $u$, M 2 $v$, and M 2 $w$, and three-phase current detecting circuits IDETu, IDETv, IDETw. The three-phase high-side transistors M 1 $u$, M 1 $v$, and M 1 $w$ and the three-phase low-side transistors M 2 $u$, M 2 $v$, and M 2 $w$ are composed of, for example, nMOS transistors or the like.

The three-phase high-side transistors M 1 $u$, M 1 $v$ and M 1 $w$ are coupled between the three-phase driving output terminals OUTu, OUTv, OUTw and the power supply voltage Vpwr. The three-phase low-side transistors M2$u$, M2$v$ and M2$w$ are coupled between the three-phase driving output terminals OUTu, OUTv, OUTw and the grounding power supply voltage GND, respectively. Each of the three-phase current detecting circuits IDETu, IDETv, IDETw includes a sensing transistor and the like, detects a current flowing through the row-side transistor of each phase, and outputs a sense voltage Vsens proportional to the detected current to the shared node.

The pre-driver unit PDVBK includes a pre-driver PDVu, PDVv, PDVw of a u phase, a v phase, and a w phase. The u-phase pre-driver PDVu complementarily drives the high-side transistor M 1 $u$ and the low-side transistor M 2 $u$ in accordance with the u-phase PWM signals PWMu from the output control unit OTCT, specifically, the PWM modulation unit PWMMD. In addition, the u-phase pre-driver PDVu drives both the high-side transistor M 1 $u$ and the low-side transistor M 2 $u$ to the off-state in accordance with the high-impedance signals HIZu of the u-phase from the PWM modulation unit PWMMD and controls the driving output terminal OUTu of the u-phase to the high-impedance state. The high-impedance signals HIZu are used, for example, to detect the BEMF of the u-phase.

Similarly, the v-phase pre-driver PDVv appropriately controls the high-side transistor M 1 $v$ and the low-side transistor M 2 $v$ in accordance with the v-phase PWM signal PWMv and the v-phase high-impedance signal HIZv. The w-phase pre-driver PDVw also appropriately controls the high-side transistor M 1 $w$ and the low-side transistor M 2 $w$ in accordance with the w-phase PWM signal PWMw and the w-phase high-impedance signal HIZw. The three-phase pre-driver PDVu, PDVv, PDVw generates the three-phase output detecting signal OUTDETu, OUTDETv, OUTDETw by shaping the actual signal generated at the three-phase driving output terminal OUTu, OUTv, OUTw in a pulse-like manner.

FIG. 18 shows a schematic configuration of the three-phase motor SPM and the sense current generation circuit SCRG. The three-phase motor SPM includes a rotor having an 8-pole structure in this example. In this case, four cycles of the electrical angle 360° (also referred to as electrical angular cycles) are included in the cycle of the mechanical angular 360° (also referred to as mechanical angular cycle) of the three-phase motor SPM. In view of this electrical angular cycle, the three-phase motor SPM can equivalently be represented by three-phase resistors Ru, Rv, Rw, coils Lu, Lv, Lw, and back electromotive force (BEMF) Vbemf (U, V, W)). For example, taking the u-phase as an example, the resistor Ru, the coil Lu, and the back electromotive force Vbemf (U) are coupled in series between the midpoint tap CT and the driving input terminal INu of the u-phase. The same applies to the v phase and the w phase, and the resistance, coil and back electromotive force of the corresponding phase are coupled in series between the midpoint tap CT and the driving input terminals INv, INw of the corresponding phase.

The driving input terminals INu, INv and INw are coupled to the driving outputs OUTu, OUTv, OUTw, respectively. In this specification, each of the driving input terminals INu, INv and INw and the driving output terminals OUTu, OUTv, OUTw are also referred to as driving terminals. The voltages of the u-phase driving terminals (OUTu, INu), the v-phase driving terminals (OUTv, INv) and the w-phase driving terminals (OUTw, INw) are referred to as driving terminal voltages Vu, Vv and Vw, respectively and the voltage of the midpoint tap CT is referred to as a midpoint tapped voltage Vct.

The sense current generation circuit SCRG samples the sense voltage Vsen from the three-phase driver SPMDV in accordance with the current sampling signal ISPL from the PWM modulation unit PWMMD. The sense current generation circuit SCRG generates a sense current Isens proportional to the sampled sense voltage Vsens by using a current amplifier or the like and causes the sense current to flow through the current detecting resistor RNF.

Returning to FIG. 17, the output controller OTCT includes a PWM modulation unit PWMMD and a PLL timing control unit PLLTC. As described with reference to FIG. 11, the PWM modulation unit PWMMD generates three-phase PWM signals PWMu, PWMv, PWMw to the three-phase driver SPMDV. As described with reference to FIG. 11, the PLL timing control unit PLLTC outputs three-phase high-impedance signals HIZu, HIZv, HIZw to the three-phase driver SPMDV, and outputs a current-sampling signal ISPL to the sense current generation circuit SCRG.

In addition to these signals, the PLL timing control unit PLLTC outputs a BEMF sampling signal BSPL, a BEMF polarity signal DIR and a masking signal MSK. The BEMF sampling signal BSPL determines timings at which the BEMF detection unit BFDET samples and holds the BEMF of the target phase to be detected. The BEMF polarity signal DIR is a signal indicating whether the transition of the BEMF of the target phase to be detected is a positive direction or a negative direction. The masking signal MSK is a signal that is asserted at a predetermined interval during which the zero crossing timing of the BEMF of the target phase to be detected may exist.

The output control unit OTCT further outputs a phase selection signal SEL and a motor phase signal PH. The phase selection signal SEL is a signal for selecting one phase out of three phases and is used to determine a target phase to be detected in the BEMF detection unit BFDET. The motor phase signal PH is a clock signal having one cycle of rotation of the electrical angle 360° of the three-phase motor SPM and is used, for example, when the HDD controller HDDCT of FIG. 1 detects the rotation speed of the three-phase motor SPM. Specifically, the HDD controller HDDCT detects the rotational speed of the three-phase motor SPM based on, for example, the frequency (or period) of the motor phase signal PH and the number of poles of the three-phase motor SPM. Then, the HDD controller HDDCT calculates a current instruction value (in other words, a torque value) SPNCR for setting the rotation speed to the target rotation speed and sets the current instruction value (torque value) in the parameter setting register PREG'.

Prior to a detailed explanation of the PLL control loop LPPLL' and the current control loop LPCR, a schematic operation of them will be explained with reference to FIG. 19. FIG. 19 shows an operation example in a period in which the motor driving apparatus drives the three-phase motor SPM at a steady-state rotation, assuming an ideal three-phase motor SPM. The motor driving apparatus drives the three-phase driving terminals with a sinusoidal wave voltage at conduction timings synchronized with three-phase back electromotive force (BEMF) Vbemf (U, V, W)) whose phases differ from each other by an electrical angle of 120°.

FIG. 19 shows the driving terminal voltage Vu of the u phase in the three phases. The driving terminal voltage Vu is controlled to be a sinusoidal wave voltage having the same phase as the back electromotive force (BEMF) Vbemf (U)) of the u-phase. However, strictly speaking, the motor driving apparatus controls not the driving terminal voltage but the driving terminal current and the back electromotive force (BEMF) so as to have the same phase. Here, the current control loop LPCR has a function of shaping the driving terminal voltage Vu (driving terminal current) into a sinusoidal wave voltage (sinusoidal wave current), and a function of determining the amplitude and phase of the sinusoidal wave voltage (sinusoidal wave current) in accordance with the error between the amplitude of sinusoidal wave current (sinusoidal wave voltage) and the current instruction value, in turn the target rotational speed.

The current control loop LPCR holds in advance soft patterns (SP1, SP2) and a PWM pattern (PWM) defining the transition of the PWM duty for each PWM period required to generate a sinusoidal wave voltage (sinusoidal wave current). The soft patterns (SP1, SP2) are used in a period in which the change of the sinusoidal wave voltage (sinusoidal wave current) is large, and the PWM pattern (PWM) is used in a period in which the change of the sinusoidal wave voltage (sinusoidal wave current) is small. The current control loop LPCR generates a sinusoidal wave voltage (sinusoidal wave current) by using such a pattern, and determines the amplitude of the sinusoidal wave voltage (sinusoidal wave current) by performing PI control (P: proportional, I: integral) by inputting the error between the driving current of each phase and the current instruction value detected by the sense current generation circuit SCRG of FIG. 18 to determine the amplitude of the sinusoidal wave voltage (sinusoidal wave current).

The current control loop LPCR determines an advanced angular phase Gdrv of the sinusoidal wave voltage for controlling the sinusoidal wave current and the back electromotive force BEMF in the same phase. The advanced angular phase Gdrv is determined by the driving current value ISPN representing the current amplitude detected by the current error detection unit CERDET and the cycle setting value NCNT generated by the PLL control loop LPPLL'.

On the other hand, the PLL control loop LPPLL' detects the phase (detected rotation phase) of the BEMF of each phase, and generates a phase switching signal (targeted rotational phase for control) COMM synchronized with the detected rotation phase by the PLL control. The phases (in other words, the conduction timings) of the three-phase driving terminal voltages (driving terminal currents) are controlled based on the phase switching signal COMM. In order to detect the phase of the BEMF of each phase, the PLL control loop LPPLL' uses a plurality of masking signals MSK provided at predetermined phase intervals (e.g., at 60° electrical angle intervals) within a mechanical angular cycle (electrical angular cycle) in synchronization with the phase switching signal COMM. The masking signal MSK is asserted to the 'L' level in a predetermined phase period called a masking period Tmsk for each cycle of the phase switching signal COMM.

In the masking period Tmsk, the driving terminal of the BEMF target phase to be detected (e.g., u-phase) is controlled to be in a high-impedance state using the high-impedance signal (HIZu) described in FIG. 18. As a result, for example, a back electromotive force (BEMF) Vbemf(U) of the u-phase is observed to the driving terminals (OUTu, INu) of the u-phase in the period of the high impedance state (referred to as the high impedance period) and a driving terminal voltage Vu of the u-phase based on the current control loop LPCR is applied to the driving terminals (LPCR, INu) of the u-phase in the period of the high impedance state (referred to as the high impedance period).

The PLL control loop LPPLL' controls the phase of the phase switching signal COMM (and thus the phase of the masking period Tmsk) so that the zero crossing timing of the BEMF of the phase to be detected (e.g., the u-phase) is maintained at the reference timing (e.g., the center timing) within the masking period Tmsk. The zero crossing timing of the BEMF is the timing of the rising zero crossing in which the BEMF crosses the intermediate level of the amplitude (the midpoint tapped voltage Vct) to the high potential side, or the timing of the falling zero crossing in which the voltage crosses to the low potential side. The PLL control loop LPPLL' monitors the levels of BEMF, for example, using comparators during high-impedance periods, and assert the zero crossing signals ZCOUT when zero crossing timing is detected.

However, in this instance, the assertion level of the zero crossing signal ZCOUT changes depending on whether the zero crossing signal rises or falls. Therefore, in this embodiment, the BEMF polarity signal DIR from the output control unit OTCT is used, and the zero crossing EOR signal ZCEOR is generated based on the polarity signal DIR and the zero crossing signal ZCOUT. The BEMF polarity signal DIR is controlled to an "L" level in a period in which the BEMF signal is zero crossing from the high potential side to the low potential side and is controlled to an "H" level in a period in which the signal is zero crossing from the low potential side to the high potential side. In the masking period Tmsk, the zero crossing EOR signal ZCEOR becomes "H" level until the zero crossing timing and becomes "L" level after the zero crossing timing, regardless of the polarities of the BEMF.

The PLL control loop LPPLL' detects the phase error between the reference timing (center timing) and the zero crossing timing in the masking period Tmsk using the error counter. In the masking period Tmsk, the error counter performs a count-up operation during the period in which the zero crossing EOR signal ZCEOR is at the "H" level and performs a count-down operation during the period in which the zero crossing EOR signal ZCEOR is at the "L" level. As a result, the counted value at the end of the masking period Tmsk becomes the final phase error PERR. The PLL control loop LPPLL' performs PI control by inputting the phase error PERR to calculate a cycle setting value NCNT, reflects the cycle setting value NCNT, and generates a phase switching signal COMM having a period proportional to the period.

In the ideal steady-state rotation state in the ideal motor as shown in FIG. 19, the phase error PERR maintains zero. In this condition, the phase of the BEMF and the phase of the conduction timings are perfectly synchronized (coincide), so that rotational jitters do not occur. On the other hand, if the zero crossing timing is earlier than the center timing of the masking period Tmsk, the phase of the BEMF is advanced, and the final phase error PERR is negative. In this case, since the cycle setting value NCNT is reduced by the PI control, the period of the phase switching signal COMM is shortened (in other words, the phase is advanced), and the masking period Tmsk is also shifted toward the phase advancing side in accordance therewith, the PI control is performed so that the negative phase error PERR is reduced at the time of detecting the next phase error.

Conversely, if the zero crossing timing is later than the center timing, the phase error PERR is positive. In this case, since the cycle setting value NCNT is increased by the PI control, the period of the phase switching signal COMM is lengthened (in other words, the phase is delayed), and the masking period Tmsk is also shifted toward the phase lag side accordingly, the PI control is performed so that the positive phase error PERR is reduced at the time of detecting the next phase error. The motor phase signal PH is generated on the basis of the phase switching signal COMM controlled in this manner, and becomes a signal representing a cycle of the electrical angle 360° of the three-phase motor SPM.

Returning to FIG. 17, the PLL control loop LPPLL' includes a BEMF detection unit BFDET, a phase error detection unit PHED, a PLL control unit (specifically, a PI compensator) PICP', a clock generation unit CGEN, and a PWM fixing unit PWMFC. The BEMF detection unit BFDET detects the zero crossing timing of the BEMF in the target phase to be detected based on the phase selection signal SEL.

Specifically, the BEMF detection unit BFDET samples the driving terminal voltage based on the midpoint tapped voltage Vct at a sampling timing based on the BEMF sampling signal BSPL for each PWM cycle included in the masking period Tmsk in a state in which the driving terminal of the target phase to be detected is controlled to be in a high-impedance state as described with reference to FIG. 19. The BEMF detection unit BFDET asserts the zero crossing signal ZCOUT when the sampled BEMF becomes zero. Note that the sampling timing is asserted in a PWM ON period within each PWM period for each PWM period.

The phase error detection unit PHED generally detects a phase error PERR between a detected rotational phase obtained by detecting the rotational phase of the three-phase motor SPM and a targeted rotational phase for control for determining the conduction timings of the three-phase motor SPM. In this case, as described with reference to FIG. 19, the detected rotational phase is the phase of the BEMF, in particular, the phase detected based on the assertion timing of the zero crossing signal ZCOUT. On the other hand, the targeted rotational phase for control is the phase of the phase switching signal COMM (in other words, the conduction timing), and more specifically, the phase of the reference timing (center timing) synchronizing with the phase switching signal within the masking period Tmsk.

The PI compensator PICP' sequentially calculates and outputs the cycle setting value NCNT (i.e., the amount of operation) for bringing the phase error PERR close to zero while sequentially reflecting the phase error PERR by the PI control. In other words, the PI compensator PICP' calculates the cycle setting value NCNT for synchronizing the phase of the phase switching signal COMM, which is the targeted rotational phase for control, with the phase of the BEMF, which is the detected rotational phase. The clock generation unit (conduction timing generation unit) CGEN sequentially controls the phase (and thus the period (frequency)) of the phase switching signal COMM based on the cycle setting value NCNT.

More specifically, as shown in FIG. 19, the clock generation unit CGEN generates the phase switching signal COMM having a cycle proportional to the cycle setting value NCNT and having a cycle corresponding to 60 degrees of the cycle having the electrical angle of 360 degrees. The clock generation unit CGEN generates an error counter clock ERRCLK serving as an operation clock of the phase error detection unit PHED and a set cycle count value DVCNT. The set cycle count value DVCNT is a value obtained by counting clock cycles in which the length of one cycle is determined based on the cycle setting value NCNT. The period of the phase switching signal COMM is determined, for example, for 32 clock cycles.

The output control unit OTCT determines the conduction timing of the three-phase motor SPM based on the phase switching signal COMM and generates various signals including the masking signal MSK based on the phase switching signal COMM. As a result, as described with reference to FIG. 19, the PLL control loop LPPLL' controls the phase or frequency of the phase switching signal COMM as a feedback loop so that the zero crossing timing of the BEMF signal is always maintained at the center timing within the masking period Tmsk. As a result, the power control unit OTCT can control the three-phase motor SPM at the conduction timing synchronized with the phase of the BEMF.

Here, in order to synchronize the conduction timing with the BEMF with high accuracy and thus to reduce the rotational jitter, the zero crossing timing of the BEMF needs to be detected with high accuracy. However, the period during which the BEMF detection unit BFDET can detect the BEMF is limited to the period during which both the PWM signals of the two conduction phases except for the target phase to be detected (i.e., the non-conduction phase associated with the high-impedance signal) are at the on level. Specifically, it is limited to a period in which one high-side transistor of the two conduction phases and the other low-side transistor of the two conduction phases are turned on.

The zero crossing timing of the BEMF does not necessarily exist in this ON level period and may exist in a period in which one conduction phase becomes an OFF level (in other words, between the ON level period of one PWM period [1] and the ON level period of the next PWM period [2]). In this instance, since the zero crossing timing of the BEMF is detected in the on-level period of the PWM cycle [2], a timing error occurs. In order to eliminate such a timing error, the PWM fixing unit PWMFC is provided in this embodiment. The PWM fixing unit PWMFC, which will be described later in detail with reference to FIG. 21 and the like, forcibly fixes the PWM period, in which the zero crossing timing of the BEMF may exist, to the on-level period.

The current control loop LPCR includes a sense current generation circuit SCRG, a current detection resistor RNF, a sense amplifier SA, an analog-to-digital converter ADC, a current error detection unit CERDET, a PI compensator PICC, a driving voltage phase generation unit DVPHG and a sinusoidal wave driving voltage generation unit SINPG. The detailed configuration and operation of the current control loop LPCR will be described later with reference to FIG. 20 and will be briefly described here.

As described with reference to FIG. 18, the sense current Isens generated by the sense current generation circuit SCRG flows through the current detecting resistor RNF. The sense current Isens is a current proportional to the current flowing in each phase of the three-phase motor SPM. The sense amplifier SA amplifies the voltage across the current detecting resistor RNF and the analog-to-digital converter ADC converts the output voltage of the sense amplifier SA into a digital value ADCO.

The current error detection unit CERDET calculates a current error CERR between the digital signal ADCO and the current instruction value SPNCR and the PI compensator PICC determines a PWM on-count value for bringing the current error CERR close to zero. The driving voltage phase generation unit DVPHG performs so-called advance angle control and calculates an advanced angular phase Gdrv for compensating the phase difference between the driving current phase and the driving voltage phase of the three-phase motor SPM. The sinusoidal wave driving voltage generation unit SINPG generates the duty instruction values PWMP, SOFTP for each PWM cycle based on the PWM on-count value from the PI compensator PICC, the advanced angular phase Gdrv from the driving voltage phase generation unit DVPHG and the phase switching signal COMM from the PLL control loop LPPLL'.

The parameter setting register PREG' holds various parameters (Kp1, Kp2, K1, K2, Kcp, Kci, Krev (U, L)), a PWM cycle setting value PCNT, a current instruction value SPNCR, a BEMF threshold value Vthb and a zero crossing mode signal ZCMD. "Kp 1" and "Kp2" are control gains used in the PI compensator PICP' for PLL control and "Kcp" and "Kci" are control gains used in the PI compensator PICC for current control.

Here, the control cycle of the PLL control is at every zero crossing timing of the BEMF and the control cycle of the current control is at every PWM cycle. For this reason, for example, the control gains Kp1 and Kp2 are determined so that the control band of the PLL control is about several 100 Hz and the control gains Kcp and Kci are determined so that the control band of the current control is about several kHz to 10 kHz. "K1" and "K2" are parameters reflecting the motor constant and are used to calculate the advanced angular phase edrv. "KrevU, L" are parameters for duty compensation and is used in the power control unit OTCT. The BEMF threshold value Vthb and the zero crossing mode signal ZCMD are used in the PWM fixing unit PWMFC and the BEMF detection unit BFDET.

Figure 20:
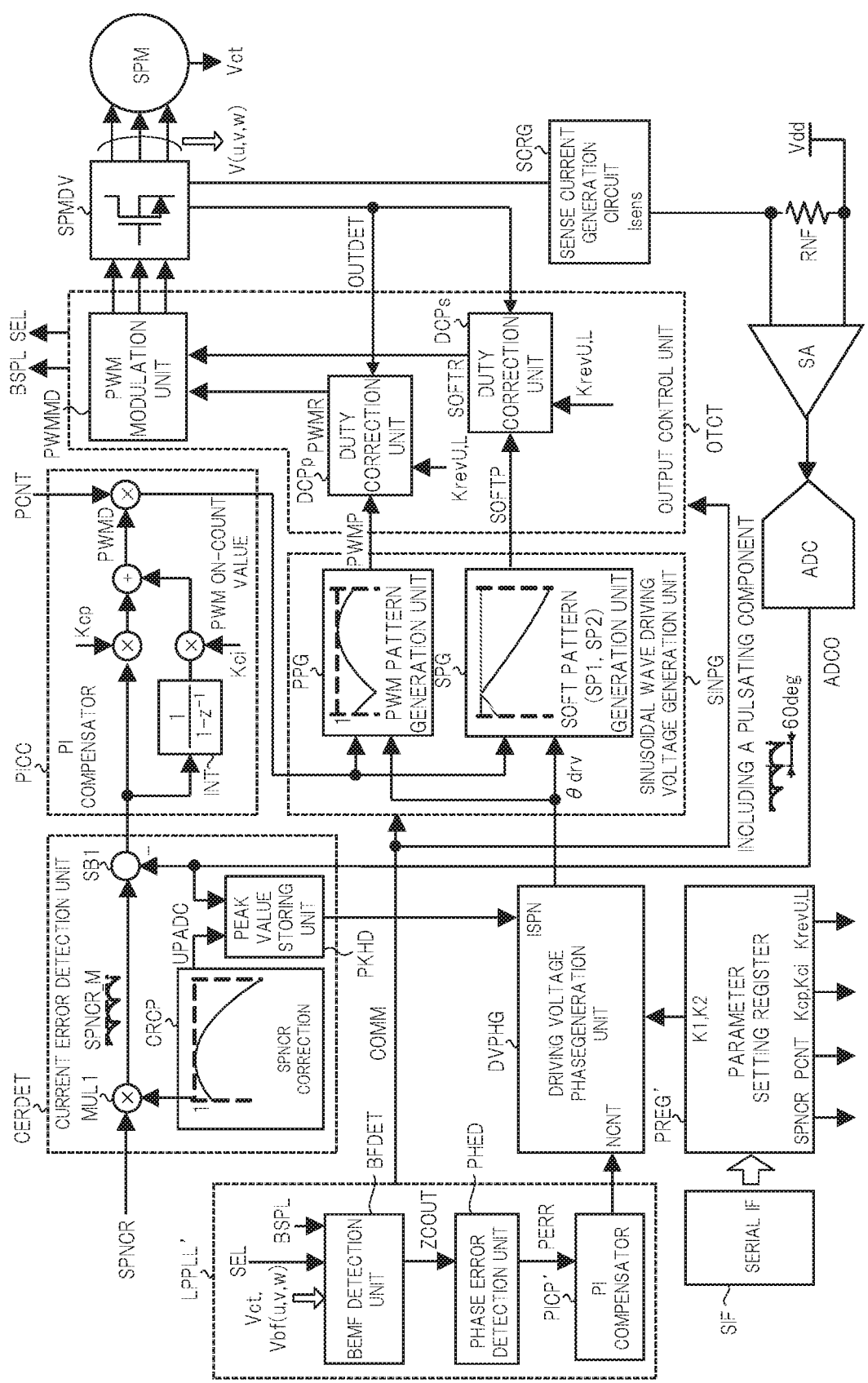
FIG. 20 is a block diagram illustrating a detailed configuration example around a current control loop in FIG. 17.

FIG. 20 is a block diagram showing a detailed configuration example around the current control loop in FIG. 17. In FIG. 20, the sense current generation circuit SCRG, the current detecting resistor RNF, the sense amplifier SA and the analog-to-digital converter ADC detect the driving currents of three phases flowing through the three-phase low-side transistors (and thus the three-phase motor SPM) as described with reference to FIG. 18 and output the detected results as digital values ADCO. The current error detection unit CERDET detects a current error between the current instruction value SPNCR and the digital value ADCO from the analog-to-digital converter ADC by using the subtractor SB1.

The PI compensator PICC includes an integrator INT and performs PI control by inputting the current error detected by the current error detection unit CERDET to calculate the PWM duty PWMD reflecting the current error. The PI compensator PICC calculates the PWM on-count value by multiplying the PWM duty value PWMD by the PWM cycle setting value PCNT. At this time, the proportional gain Kcp and the integral gain Kci used in the PI control and the PWM cycle setting value PCNT are held in the parameter setting register PREG'. The PWM cycle setting value PCNT is a value obtained by converting the time of one cycle of the PWM signal into a count value and the PWM on-count value is a value obtained by converting the ON period during one cycle of the PWM signal into a count value.

The sinusoidal wave driving voltage generation unit SINPG receives the PWM on-count value from the PI compensator PICC and the phase switching signal COMM from the PLL control loop LPPLL' and generates duty indication values PWMP, SOFTP for each PWM cycle. The duty instruction values PWMP, SOFTP are instruction values for applying a three-phase sinusoidal wave voltage to the three-phase motor SPM and setting the amplitude of the sinusoidal wave voltage to a value corresponding to the PWM on-count value.

More specifically, the motor driving apparatus divides one cycle of the sinusoidal wave (360° electrical angle) into periods of every 60° electrical angle, fixes one phase in the three-phase driving output terminals OUTu, OUTv, OUTw to the power supply voltage Vpwr or the grounding power supply voltage GND in each period and controls the remaining two phases by PWM signals, similarly to the method of Japanese unexamined Patent Application publications No. 2017-85799. The sinusoidal wave driving voltage generation unit SINPG determines the duty of the remaining two-phase PWM signals for each PWM cycle, i.e. how to change the duty for each PWM cycle within a period of an electrical angle of 60°.

Specifically, the sinusoidal wave driving voltage generation unit SINPG includes a PWM pattern generation unit (PPG) and a soft pattern (SP1, SP2) generation unit (SPG). As described with reference to FIG. 19, the PWM pattern generation unit PPG and the soft pattern generation unit SPG include in advance a normalization table or the like in which a duty pattern for generating a sinusoidal wave is defined. Each of the PWM pattern generation unit PPG and the soft pattern generation unit SPG performs weighting based on the PWM on-count value on the value of the normalization table or the like for each PWM cycle to generate the duty instruction values PWMP, SOFTP.

The power controller OTCT includes duty correction units DCPp, DCPs and a PWM modulation unit PWMMD. The duty correction unit DCPp detects an error in the duty generated between the input and output of the three-phase driver SPMDV and adds a correction value that cancels the error to the duty instruction value PWMP to generate a corrected duty instruction value PWMR. Specifically, the duty correction unit DCPp receives the output detection signal OUTDET from the three-phase driver SPMDV, detects the actual duty, and determines the correction value based on the difference between the actual duty and the duty instruction value PWMP.

Further, when the duty instruction value PWMP is larger than the duty defined by the duty correction parameters KrevU and L, the duty correction unit DCPp determines the correction value based on a predetermined arithmetic expression. That is, when the duty instruction value PWMP is large, the on/off state of the transistor becomes insufficient, and therefore, there is a case where a correction value different from the correction value when the duty instruction value PWMP is small is required. The duty correction unit DCPp determines the correction value based on the arithmetic expression. Similar to the duty correction unit DCPp, the duty correction unit DCPs adds a predetermined correction value to the duty instruction value SOFTP to generate a corrected duty instruction value SOFTR.

As shown in FIG. 18, the PWM modulation unit PWMMD controls the three-phase driver SPMDV using three-phase PWM signals PWMu, PWMv, PWMw. When the three-phase motor SPM is driven by the sinusoidal wave voltage, the PWM modulation unit PWMMD fixes the one-phase (e.g. u-phase) high-side transistor or low-side transistor to the on state every time the electrical angle is 60° based on the phase switching signal COMM, thereby fixing the one-phase driving output terminal (OUTu) to the power supply voltage Vpwr or the grounding power supply voltage GND. Then, the PWM modulation unit PWMMD generates the remaining two-phase (v-phase, w-phase) PWM signals (PWMv, PWMw) based on the corrected duty instruction values PWMR, SOFTR.

In this manner, the PWM modulation unit PWMMD controls the three-phase driver SPMDV while performing switching at every electrical angle of 60°. Further, since the driving current of the three-phase motor SPM has a sinusoidal wave shape, the current detected by the current detecting resistor RNF includes a pulsating component in which a cycle of an electrical angle of 60° including the vertex of the sinusoidal wave is repeated, as shown in FIG. 20. On the other hand, the current instruction value SPNCR is a DC component. Therefore, when the current instruction value SPNCR is used as it is, there is a possibility that a current error with respect to the digital value ADCO cannot be detected with high accuracy. Therefore, the current error detection unit CERDET includes an instruction current correcting unit CRCP for generating digital patterns obtained by copying the sinusoidal wave waveforms and a peak value storing unit PKHD.

The current error detection unit CERDET multiplies the current instruction value SPNCR by the digital pattern from the instruction current correcting circuit CRCP using the multiplier MUL1 and outputs the multiplied current instruction value SPNCR-M to the subtractor SB1. Further, the instructed current correcting circuit CRCP outputs the trigger signal UPADC at the peak timing of the sinusoidal wave waveform and the peak value storing unit PKHD latches the digital value ADCO as the driving current value ISPN in accordance with the trigger signal UPADC. The driving current value ISPN represents the amplitude of the driving current.

The driving voltage phase generation unit DVPHG calculates the advanced angular phase edrv by performing a predetermined calculation using the cycle setting value NCNT from the PLL control loop LPPLL', the driving current value ISPN from the current error detection unit CERDET and the parameters K1 and K2 from the parameter setting register PREG'. The sinusoidal wave driving voltage generation unit SINPG shifts the PWM pattern and the soft pattern by the electrical angle based on the advanced angular phase edrv and generates the duty instruction values PWMP, SOFTP using the shifted pattern.

In other words, in the three-phase motor SPM, the phase of the BEMF and the phase of the driving current are matched with each other, whereby the three-phase motor SPM can be driven highly efficient. However, since the actual operation is driven by a voltage, the driving voltage phase needs to be controlled in order to make the phase of the BEMF coincide with the phase of the driving current. More specifically, control (referred to as advance angle control) is required to apply the driving voltage to the three-phase motor SPM in a phase advanced by the advanced angular phase edrv from the BEMF phase in accordance with various coefficients (a resistive component, an inductance component, a rotational speed, a back electromotive force constant and a driving current) of the three-phase motor SPM. Therefore, the driving voltage phase generation unit DVPHG calculates the advanced angular phase edrv based on a prescribed arithmetic expression using these various coefficients as variables. In this case, the resistive component, the inductance component and the back electromotive force constant are determined by the parameters K1 and K2, the rotational speed is determined by the cycle setting value NCNT and the driving current is determined by the driving current value ISPN.

Figure 21:
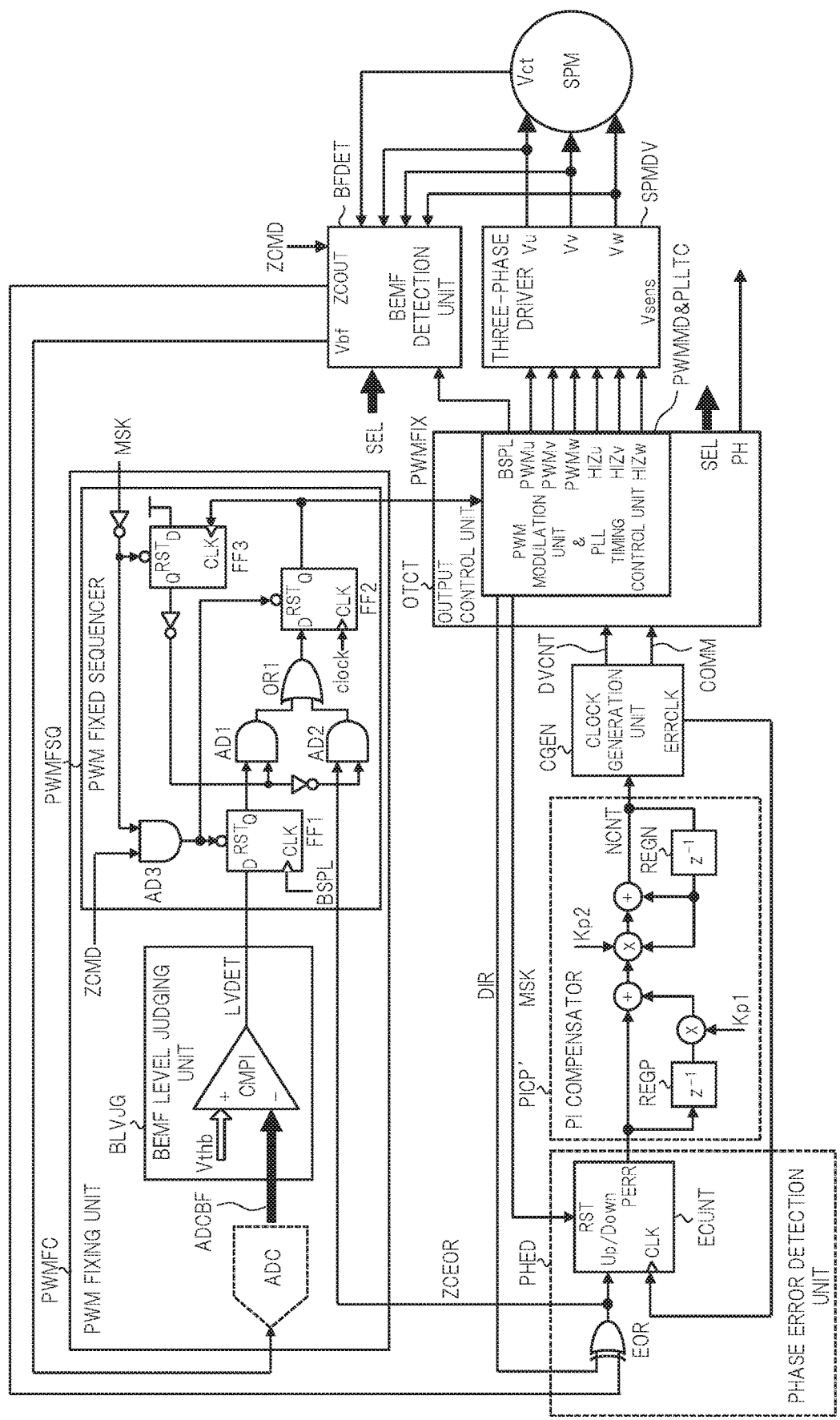
FIG. 21 is a block diagram showing a detailed configuration example around the PLL control loop in FIG. 17.
Figure 22:
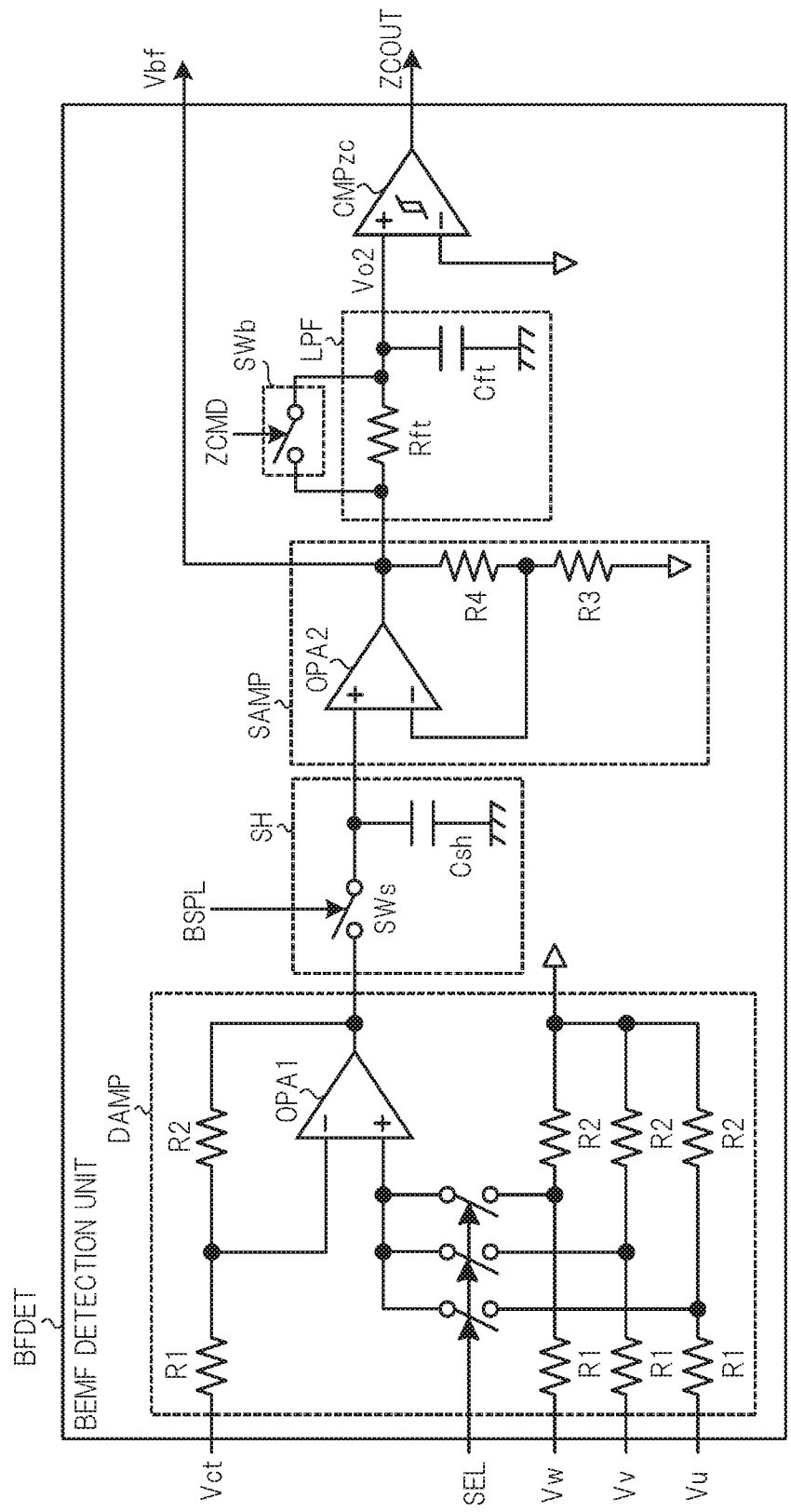
FIG. 22 is a circuit diagram illustrating a detailed configuration example of a BEMF detecting unit in FIG. 21.

FIG. 21 is a block diagram showing a detailed configuration example around the PLL control loop in FIG. 17. FIG. 22 is a circuit diagram showing a detailed configuration of the BEMF detecting unit shown in FIG. 21. In FIG. 22, the BEMF detection unit BFDET includes a differential amplifier circuit DAMP, a sample-and-hold circuit SH, an amplifier circuit SAMP, a low-pass filter LPF, a comparator CMPzc and a bypass switch SWb. The differential amplifier DAMP includes an operational amplifier OPA1 and a plurality of sets of resistor elements R1 and R2 and amplifies the driving terminal voltage (Vu or Vv or Vw) of the phases selected by the phase selection signal SEL with a gain based on the resistance values of the resistor elements R1 and R2 with reference to the midpoint tapped voltage Vct.

The sample-and-hold circuit SH samples the output voltage of the differential amplifier circuit DAMP according to the BEMF sampling signal BSPL and holds the output voltage of the differential amplifier circuit DAMP in the capacitor Csh. The BEMF sampling signal BSPL is asserted every PWM period within the masking period Tmsk. The amplifier SAMP includes an operational amplifier OPA2 and resistive elements R3 and R4 and amplifies the voltage held by the capacitive element Csh with a gain based on the resistance values of the resistive elements R3 and R4. The amplifying circuit SAMP is provided to improve the sensing sensitivitie of the subsequent comparator CMPzc. However, in some cases, the amplifier circuit SAMP may be omitted.

The low-pass filter LPF includes a resistive element Rft and a capacitive element Cft and filters the BEMF Vbf amplified by the amplifier SAMP. The low-pass filter LPF is provided to reduce a sampling error caused by BEMF sampling and smooth the stepwise voltage held by the capacitive element Csh along with sampling.

The comparator CMPzc compares the output voltage Vo2 of the low-pass filter LPF with the zero voltage and thereby generates a zero crossing signal ZCOUT. In this embodiment, the comparator CMPzc outputs the "H" level when the output voltage Vo2 is higher than the zero voltage. Also, in this embodiment, the hysteretic comparator is used to prevent chattering of the zero crossing signal ZCOUT. The bypass switch SWb is coupled in parallel to the resistive element Rft of the low-pass filter LPF, bypasses the low-pass filter LPF when it is controlled to be on in accordance with the zero crossing mode signal ZCMD and does not bypass the low-pass filter LPF when it is controlled to be off in accordance with the zero crossing mode signal ZCMD.

In FIG. 21, the phase error detection unit PHED includes EXOR gates EOR and error counters ECUNT and generally detects a phase error PERR between a detected rotational phase obtained by detecting a rotational phase of the three-phase motor SPM and a targeted rotational phase for control for determining the conduction timings of the three-phase motor SPM as described with reference to FIG. 17. The EXOR gate EOR performs an EXOR operation between the zero crossing signal ZCOUT from the BEMF detection unit BFDET and the BEMF polarity signal DIR from the output control unit OTCT and thereby outputs the zero crossing EOR signal ZCEOR as shown in FIG. 19.

The error counter ECUNT operates in the assertion period (masking period) of the masking signal MSK and performs a count-up operation or a count-down operation in accordance with the logical level of the zero crossing EOR signal ZCEOR using the error counter clock ERRCLK from the clock generation unit CGEN. For example, as shown in FIG. 19, the error counter ECUNT performs the count-up operation while the logical level of the zero crossing EOR signal ZCEOR is at the "H" level and performs the count-down operation while the logical level of the zero crossing EOR signal ECUNT is at the "L" level. As a result, the phase error PERR obtained as the final count value of the error counter ECUNT becomes a negative value when the zero crossing timing of the BEMF is ahead of the center timing of the masking period Tmsk and becomes a positive value when the zero crossing timing of the PERR is behind the center timing of the masking period ECUNT.

As described with reference to FIG. 17, the PI compensator PICP' sequentially calculates and outputs the cycle setting value NCNT (i.e. the amount of operation) for bringing the phase error PERR close to zero while sequentially reflecting the phase error PERR by PI control. In this embodiment, the PI compensator PICP' performs PI control using the previous phase error PERR held in the phase error register REGP (in the previous sample period), the previous cycle setting value NCNT held in the cycle setting register REGN (in the previous sample period) and the control gains Kp1 and Kp2.

At this time, the PI compensator PICP' reflects the cycle setting value NCNT in the previous sampling period held in the cycle setting register REGN to the control gain. As a result, since the control band changes in proportion to the rotational velocity, a wide lock range, optimum responsiveness and stabilization can be obtained in the PI compensator PICP'. That is, if the fixed control band is determined in accordance with the case where the rotation speed is low, the responsiveness in the case where the rotation speed is high is lowered and conversely, if the fixed control band is determined in accordance with the case where the rotation speed is high, the stability in the case where the rotation speed is low is lowered. The PI compensator PICP' can be used to solve such problems.

The clock generation unit (conduction timing generation unit) CGEN sequentially controls the phase (and the frequency) of the phase switching signals (targeted rotational phase for control) COMM based on the cycle setting value NCNT. More specifically, the phase switching signal COMM is controlled so that the period becomes longer (the frequency becomes lower) as the cycle setting value NCNT become larger. The clock generation unit CGEN generates the set cycle count value DVCNT and the error counter clock ERRCLK. The error counter clock ERRCLK is a clock which is adjusted so that the output of the error counter ECUNT has a constant detecting gain with respect to the rotational speed of the three-phase motor SPM at all times. Specifically, the error counter clock ERRCLK is controlled so that the cycle becomes longer (the frequency becomes lower) as the rotational velocity becomes lower (the cycle setting value NCNT becomes larger).

The PWM fixing unit PWMFC includes an analog-to-digital converter ADC, a BEMF level judging unit BLVJG and a PWM fixed sequencer PWMFSQ. In general, the PWM fixing unit PWMFC first monitors the back electromotive force (BEMF) Vbf from the BEMF detection unit BFDET and the zero crossing signal ZCOUT (in this example, the equivalent zero crossing EOR signal ZCEOR). Then, the PWM fixing unit PWMFC controls the PWM fixed signal PWMFIX to the asserted level in a period (referred to as an on-fixed period) from a predetermined timing after the amplitude level of the back electromotive force Vbf becomes smaller than the BEMF threshold value Vthb until the zero crossing signal ZCOUT (zero crossing EOR signal ZCEOR) is asserted. The PWM modulation unit PWMMD receives the PWM fixed signal PWMFIX and fixes the high-side transistor of one phase and the low-side transistor of the other phase of the two conduction phases to ON in the on-fixed period regardless of the PWM period.

Specifically, the analog-to-digital converter ADC converts the back electromotive force Vbf from the BEMF detection unit BFDET, in particular, the absolute value of the magnitude of the back electromotive force Vbf, into a digital value ADCBF. The BEMF level judging unit BLVJG includes a comparator CMP1 compares the digital value ADCBF from the analog-to-digital converter ADC with a digital value corresponding to the BEMF threshold value Vthb and outputs a level detecting signal LVDET as a result of the comparison. Here, when the digital value ADCBF (the absolute value of the amplitude of the back electromotive force Vbf) becomes smaller than the BEMF threshold value Vthb, the comparator CMP1 outputs the level detection signal LVDET of "H" level.

The PWM fixed sequencer PWMFSQ includes AND gates AD1 to AD3, an OR gate OR1 and flip-flops FF1 to FF3. The PWM fixed sequencer PWMFSQ receives the level detecting signal LVDET from the comparator CMP1 and the zero crossing signal ZCOUT (specifically, the zero crossing EOR signal ZCEOR) and generates a PWM fixed signal PWMFIX which becomes an asserted level (here, "H" level) during the on-fixed period.

Figure 23:
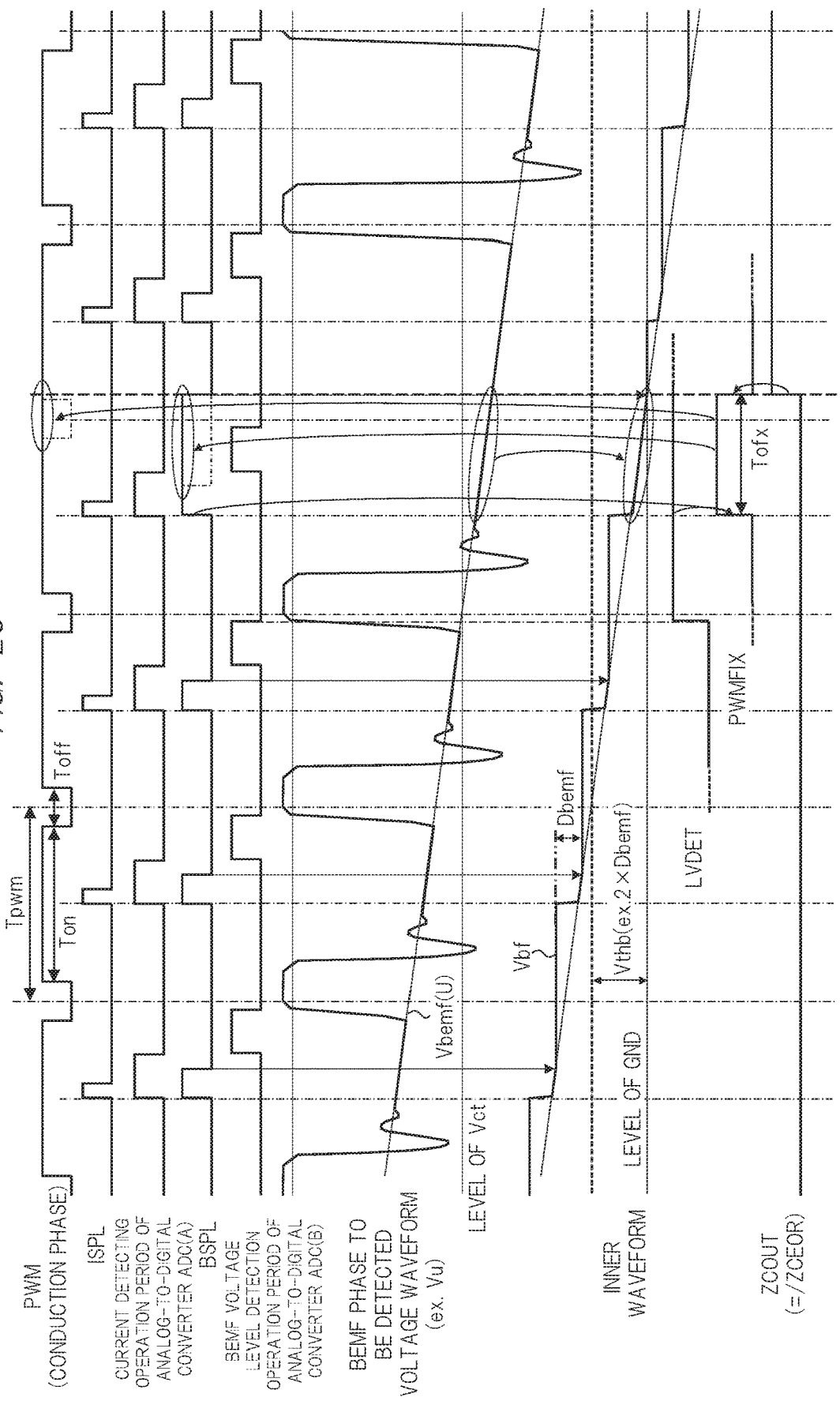
FIG. 23 is a timing chart illustrating a detailed example of operation in the masking period of FIG. 19.

FIG. 23 is a timing chart showing a detailed operation example in the masking period of FIG. 19. As shown in FIG. 23, the driving terminal voltage Vu of the non-conduction phase (in this case, u phase) serving as the target phase to be detected changes in synchronization with the PWM signal of the conduction phases (v phase, w phase) of the remaining two phases. In a period (referred to as a PWM ON period Ton) in which the PWM signal is at the "H" level (ON level), one of the driving terminal voltages Vv and Vw of the two conduction phases (v-phase and w-phase) becomes the power supply voltage Vpwr when the high-side transistor is turned on and the other of the driving terminal voltages Vv and Vw becomes the ground power supply voltage GND when the low-side transistor is turned on. As a result, the midpoint tapped voltage Vct becomes "Vpwr/2" and the driving terminal voltage Vu in the non-conduction phase becomes a voltage obtained by superimposing the back electromotive force Vbemf (U) on the midpoint tapped voltage Vct.

On the other hand, in a period (referred to as a PWM off period Toff) in which the PWM signal is at the "L" level (off level), the reflux operation is performed on the high side or the low side of the two conduction phases (v phase, w phase). FIG. 23 illustrates a case where the reflux operation is performed on the high side. According to the feedback operation, the driving terminal voltages Vv and Vw of the two conduction phases become near the power supply voltage Vpwr when the high-side transistor is turned on, or become near the ground power supply voltage GND when the low-side transistor is turned on. Therefore, it is not easy to detect the back electromotive force Vbemf (U) from the driving terminal voltage Vu in the PWM-off period Toff.

Therefore, the zero crossing timing of the BEMF is detected in the PWM on-period Ton within each PWM cycle Tpwm for each PWM cycle Tpwm.

The BEMF sampling signal BSPL for detecting the BEMF is set to a timing at which ringing is avoided and is set to a timing after the center of the PWM cycle Tpwm in this embodiment. In addition, the current sampling signal ISPL for current control and the operation period of the analog-to-digital converters ADC associated therewith are also set from the center timings of the PWM cycle Tpwm. As a result, the mean value of the driving current in the PWM cycle Tpwm can be sampled.

The sample-and-hold circuit SH shown in FIG. 22 samples the driving terminal voltage Vu of the non-conduction phase with reference to the midpoint tapped voltage Vct in accordance with the assertion level ("H" level) of the BEMF sampling signal BSPL. As a result, the input voltage (Vbf) to the low-pass filter LPF changes in the same manner as the back electromotive force Vbemf (U) in the "H" level period of the BEMF sampling signal BSPL and becomes a constant level in the "L" level period so that the input voltage Vbf becomes a stepped waveform. The low-pass filter LPF smooths an input voltage Vbf having a stepped waveform to generate an output voltage Vo2.

However, in the method of sampling the BEMF in the PWM ON period Ton within the PWM cycle Tpwm including the PWM ON period Ton and the PWM OFF period Toff as described above, an error may occur when, for example, the zero crossing timing of the BEMF is located in the PWM OFF period Toff as described with reference to FIG. 17. Therefore, in this case, first, the BEMF level judging unit BLVJG in the PWM fixing unit PWMFC performs determination on the staircase-shaped back electromotive force Vbf using the BEMF threshold value Vthb.

The BEMF threshold value Vthb is set to, for example, "2×Dbemf" or the like, with the change in BEMF occurring in one PWM cycle Tpwm as "Dbemf". The BEMF threshold value Vthb is obtained in advance, for example, by simulations or the like, and is set in the parameter setting register PREG' from the outside of the device. When the amplitude level of the back electromotive force Vbf becomes smaller than the BEMF threshold value Vthb at the end of the converting period (B) by the analog-to-digital converter ADC, the BEMF level judging unit BLVJG outputs the level detecting signal LVDET of the "H" level.

When the level detecting signal LVDET becomes the "H" level, the PWM-fixed signal PWMFIX is controlled to the "H" level at the rising edge of the subsequent BEMF sampling signal BSPL. In the period (on-fixed period Tofx) in which the PWM fixed signal PWMFIX is at the "H" level, the PWM signal in the conduction phase is fixed at the "H" level and the BEMF sampling signal BSPL is also fixed at the "H" level. As a result, the BEMF detection unit BFDET of FIG. 22 continuously detects the BEMF instead of every PWM cycle in the on-fixed period Tofx. Accordingly, the back electromotive force Vbf also has a continuous waveform instead of a stepped waveform.

Thereafter, when the zero crossing signal ZCOUT (the zero crossing EOR signal ZCEOR) is asserted, the PWM-fixed signal PWMFIX is controlled to "L" level. In response to this, the "H" levels of the PWM signal of the conduction phase and the BEMF sampling signal BSPL are also released and the operation returns to the normal operation. That is, the PWM signal of the conduction phase becomes a signal based on a predetermined duty instruction and the BEMF sampling signal BSPL becomes a signal asserted in the PWM on-period Ton every PWM cycle Tpwm.

Such an operation of the PWM fixing unit PWMFC makes it possible to detect the zero crossing timing of the BEMF with high accuracy and consequently to reduce the rotational jitter. The bypass switch SWb shown in FIG. 22 bypasses the low-pass filter LPF based on the zero crossing mode signal ZCMD of the parameter setting register PREG' when the zero crossing detecting operation using the PWM fixing unit PWMFC is performed. This eliminates the delay time associated with the filtering and enables the zero crossing timing to be detected with higher accuracy.

On the other hand, since the amplitude of the BEMF changes depending on the rotation speed of the three-phase motor SPM, the BEMF threshold value Vthb also needs to be changed depending on the rotation speed. Therefore, as shown in FIG. 23, the zero crossing detecting operation using the PWM fixing unit PWMFC is enabled, for example, at the time of steady-state rotation in which rotational jitter is a concern and is disabled, for example, at the time of starting the three-phase motor SPM. In the disabled state, the zero crossing detection is performed by a method of sampling the BEMF in the PWM ON period Ton in the PWM cycle Tpwm including the PWM ON period Ton and the PWM OFF period Toff (a method of monitoring the step-like back electromotive force Vbf through the low-pass filter LPF) as usual. The switching of the enabling/disabling is performed by the zero crossing mode signal ZCMD.

Figure 24:
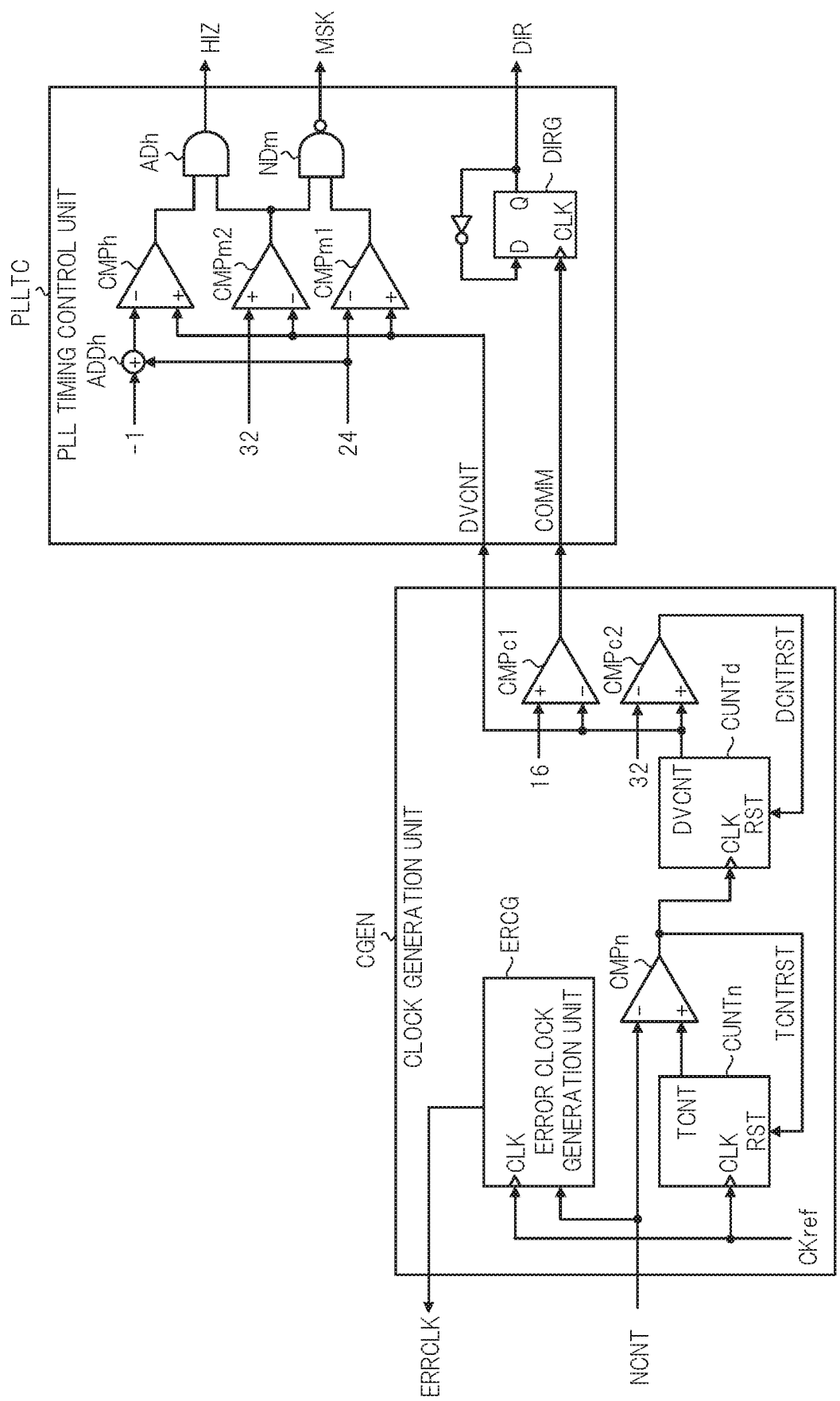
FIG. 24 is a circuit diagram illustrating a detailed configuration example of a clock generating unit and a PLL timing control unit in FIG. 17.

FIG. 24 is a circuit diagram showing a detailed configuration example of the clock generation unit and the PLL timing control unit in FIG. 17. The clock generation unit CGEN includes counters CUNTn, CUNTd, comparators CMPn,CMPc1,CMPc2 and an error clock generation unit ERCG. The counter CUNTn counts up by using the reference clock CKref for digital control as a trigger and the comparator CMPn outputs a pulse signal when the count value (TCNT) of the counter CUNTn reaches the cycle setting value (NCNT). The count value (TCNT) of the counter CUNTn is reset in response to the pulse signal (reset signal TCNTRST).

The counter CUNTd counts up with the pulse signal outputted from the comparator CMPn as a trigger and outputs the count value as a set cycle count value DVCNT. The comparator CMPc2 outputs a pulse signal when the set cycle count value DVCNT reaches a predetermined value, e.g. 32. The set cycle count value DVCNT of the counter CUNTd is reset in response to the pulse signal DCNTRST. As a result, the counter CUNTd repeats the operation of counting 32 cycles of the cycle based on the cycle setting value NCNT (sequentially outputting 0 to 31).

The comparator CMPc1 outputs the "H" level during the period in which the set cycle count value DVCNT are 0 to 15 and outputs the "L" level during the period in which the set cycle count value DVCNT are 16 to 31. The output signal becomes a phase switching signal COMM. The error clock generation unit ERCG generates an error counter clock ERRCLK having a frequency corresponding to the cycle setting value NCNT by using the reference clock CKref.

The PLL timing control unit PLLTC includes an adder ADDh, comparators CMPh, CMPm1, CMPm2, an AND gate ADh, a NAND gate NDm and a polarity-signal generator DIRG. The comparator CMPm1 outputs the "H" level in the period in which the set cycle count value DVCNT is 24 to 31 and the comparator CMPm2 outputs the "H" level in the period in which the set cycle count value DVCNT is 0 to 31. The NAND gate NDm asserts the masking signal MSK to the "L" level in a period in which the set cycle count value DVCNT is 24 to 31 by performing a logical operation on the outputs of the comparators CMPm1, CMPm2.

The adder ADDh adds "−1" to the determination value (here, 24) of the comparator CMPm1 and sets the result (i.e. 23) as the determination value of the comparator CMPh. As a result, the comparator CMPh outputs the "H" level in the period in which the set cycle count value DVCNT is 23 to 31. The AND gate ADh asserts the high-impedance signal HIZ to the "H" level in a period in which the set cycle count value DVCNT including the masking period is 23 to 31 by performing a logical operation on the outputs of the comparators CMPh, CMPm2. The polarity signal generation unit DIRG generates the BEMF zero crossing polarity signal DIR by performing polarity inversion for each rising edge of the phase switching signal COMM.

Here, the assertion timing of the high impedance signal HIZ is one count before the assertion timing of the masking signal MSK. This is to prevent erroneous detection of the zero crossing timing of the BEMF. That is, when the phase to be detected by the BEMF becomes a high-impedance state in accordance with the assertion of the high-impedance signal HIZ, there is a possibility that the BEMF zero crossing occurs due to the kickback. This is to prevent erroneous detection accompanying this.

Figure 25:
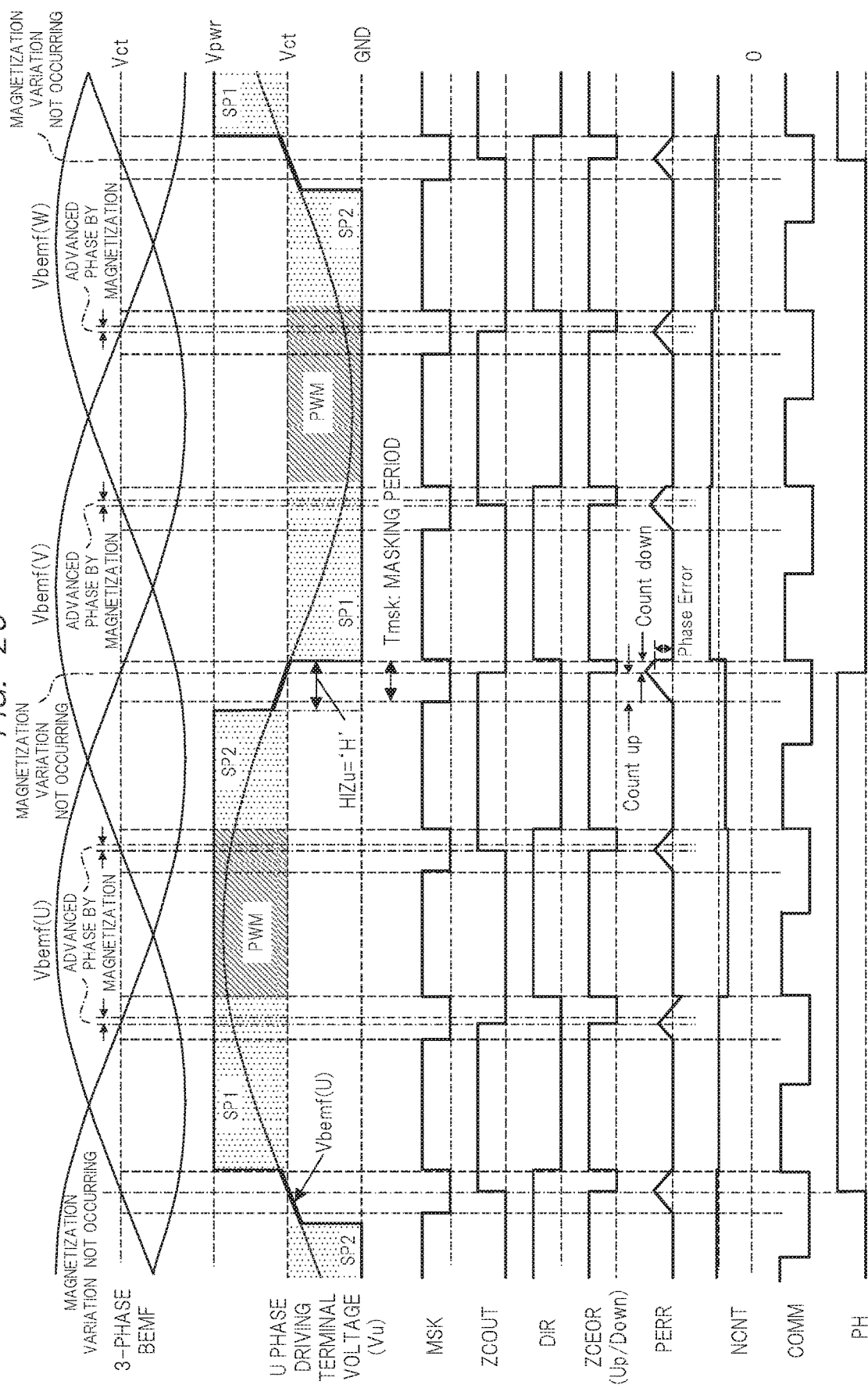
FIG. 25 is a timing chart illustrating an example of operation when magnetization variation occurs in the motor driving apparatus in FIG. 17.

FIG. 25 is a timing chart showing an operation example in the case where magnetization variation occurs in the motor driving apparatus of FIG. 17. In FIG. 25, unlike the case of FIG. 19, magnetization variation occurs. If magnetization variation occurs in the three-phase motor SPM, the phase error PERR may fluctuate without maintaining zero even when the PLL control is locked. For example, in FIG. 25, the magnetization of the BEMF of the v phase and the w phase is relatively advanced to be in phase.

In this instance, for example, at the time of detecting the falling zero crossing of the w phase, the phase error PERR becomes negative and the cycle setting value NCNT becomes small, thereby shortening the cycle of the subsequent phase switching signal COMM. At the time of detecting the rising zero crossing of the subsequent v phase, since it is also the advanced phase, the phase error PERR becomes zero with the period of the phase switching signal COMM which becomes shorter and the cycle setting value NCNT does not change greatly. At the time of detecting the trailing crossing of the subsequent u-phase, since the magnetization variation does not occur, the phase error PERR becomes positive with the period of the shortened phase switching signal COMM and the cycle setting value NCNT become large. Here, for convenience of explanation, the cycle setting value NCNT immediately follows the phase error PERR, but actually, the cycle setting value NCNT smoothly follows the phase error PERR through a certain delay according to the control band of the PI-compensator PICP'.

At the time of the steady-state rotation, if the magnetization variation does not occur in the ideal state as shown in FIG. 19, the phase error PERR inputted to the PI compensator PICP' becomes zero. In this ideal state, the three-phase motor SPM can be driven in a state in which the BEMF and the conduction timings are always synchronized with each other so that rotational jitter does not occur. On the other hand, when the magnetization variation occurs as shown in FIG. 25, the phase of the BEMF varies for each cycle of the phase switching signal COMM and accordingly the phase error PERR also varies as appropriate. This state is a state in which the synchronization between the BEMF and the conduction timings varies and therefore a rotational jitter is incurred. More specifically, the PI compensator PICP' operates so as to suppress the variation of the phase error PERR due to the magnetization variation, but in practice, the PI compensator PERR' can suppress the variation only to a certain extent. The variation component which cannot be suppressed becomes a cause of the rotational jitter.

In the case of the position-sensorless three-phase motor SPM as shown in FIG. 17, the magnetization variation is caused by, for example, variation in the position of the magnetic pole of the rotor, variation in the mounting position of the stator or the like. Further, in the case of a motor with a sensor, it is also caused by variations in the mounting position of the position sensor or the like. On the other hand, it is also possible to suppress the occurrence itself of such magnetization variation, that is, manufacturing variation and thereby reduce the rotational jitter, but in this case, the manufacturing cost is increased. For this reason, any mechanism capable of sufficiently reducing the rotational jitter is required even when the magnetization variation occurs.

Figure 2:
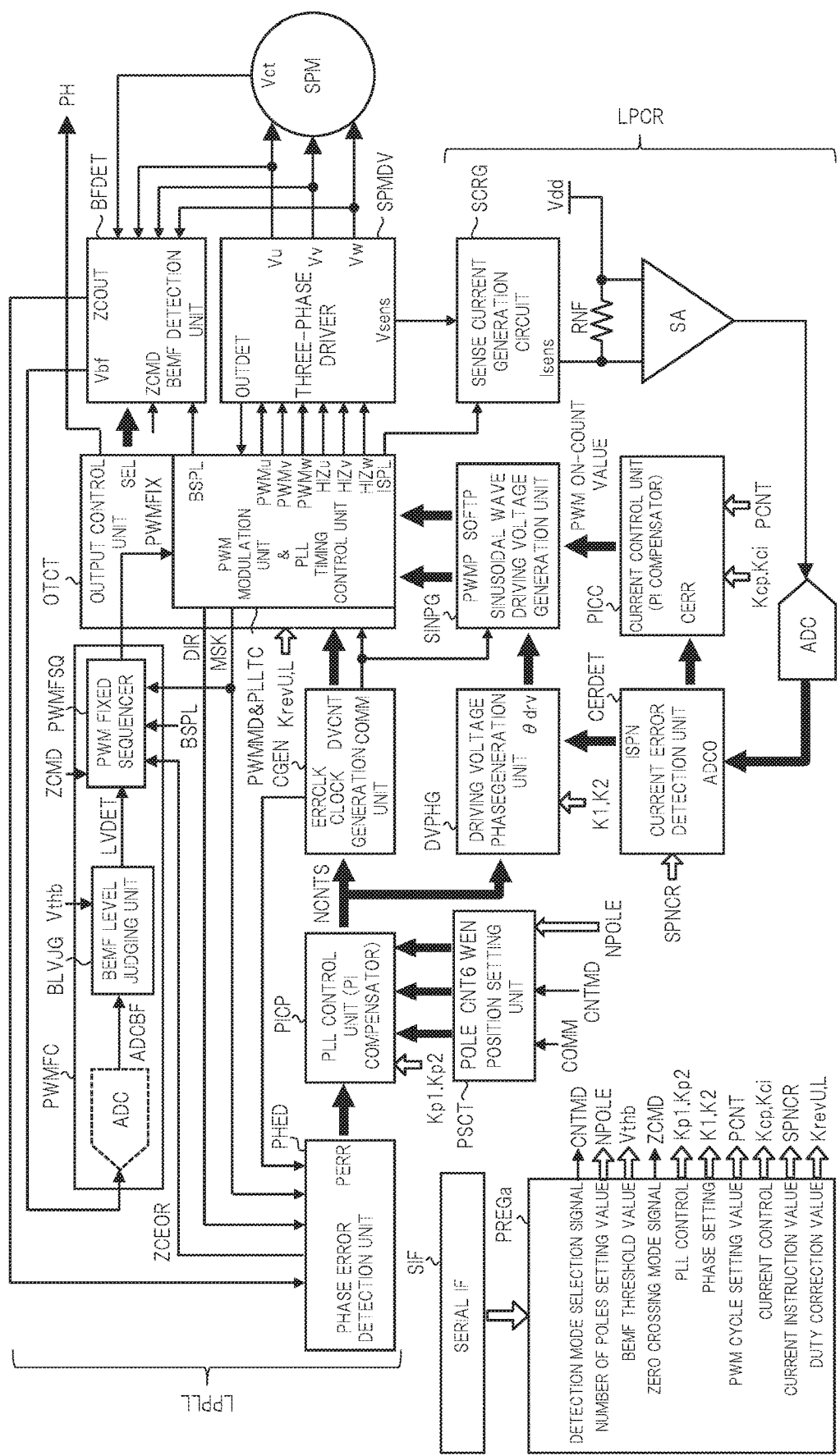
FIG. 2 is a block diagram illustrating a schematic configuration example of a motor driving apparatus according to one embodiment of the present invention.

FIG. 2 is a block diagram showing an example of a schematic configuration of a motor driving apparatus according to Embodiment 1 of the present invention. The motor driving apparatus shown in FIG. 2 differs from the motor driving apparatus shown in FIG. 17 in the configuration of the PLL control unit (PI compensator) PICP in the PLL control loop LPPLL. Along with this, in FIG. 2, a position setting unit PSCT is added. Further, the parameter setting register PREGa outputs a detection mode selection signal CNTMD and a number of poles setting value NPOLE in addition to the various signals described with reference to FIG. 17.

The PI compensator PICP has a plurality of cycle setting registers corresponding to a plurality of detection timings (e.g. BEMF zero crossing timings) provided within one mechanical angular cycle as will be described in detail later. The PI compensator PICP stores the determined cycle setting value (amount of operation) NCNTS in the corresponding one cycle setting register for each of a plurality of detection timings in the previous mechanical angular cycle. Then, the PI compensator PICP determines the cycle setting value NCNTS in the current mechanical angular cycle by reflecting the cycle setting value NCNTS stored in the corresponding one cycle setting register for each of a plurality of detection timings in the current mechanical angular cycle.

The position setting unit PSCT controls switching of the cycle setting register for each of the plurality of detection timings based on the phase switching signal COMM from the clock generation unit CGEN and the number of poles setting value NPOLE from the parameter setting register PREGa. Specifically, the position setting unit PSCT generates a pole position signal POLE representing the position of the electrical angle 360° (electrical angular cycle) within the mechanical angular cycle and a phase position signal CNT6 representing the position of the section of the electrical angle 60° (phase switching section based on the phase switching signal COMM) within the electrical angular cycle.

In addition, the position setting unit PSCT generates a write enable signal WEN for enabling the writing of the corresponding cycle setting register in accordance with the pole position and the phase position. The PI compensator PICP can select two operation modes (switching mode and fixed mode) according to the detection mode selection signal CNTMD. In the switching mode, the PI compensator PICP calculates the cycle setting value NCNTS while switching the cycle setting register corresponding to each of the plurality of detection timings. On the other hand, in the fixed mode, the PI compensator PICP stores the cycle setting value NCNTS for each of the plurality of detection timings commonly in the plurality of cycle setting registers, thereby calculating the cycle setting value NCNTS by regarding the plurality of cycle setting registers as one cycle setting register. Thus, in the fixed-mode, the PI compensator PICP performs the same operation as the PI compensator PICP' shown in FIGS. 17 and 19.

Figure 3:
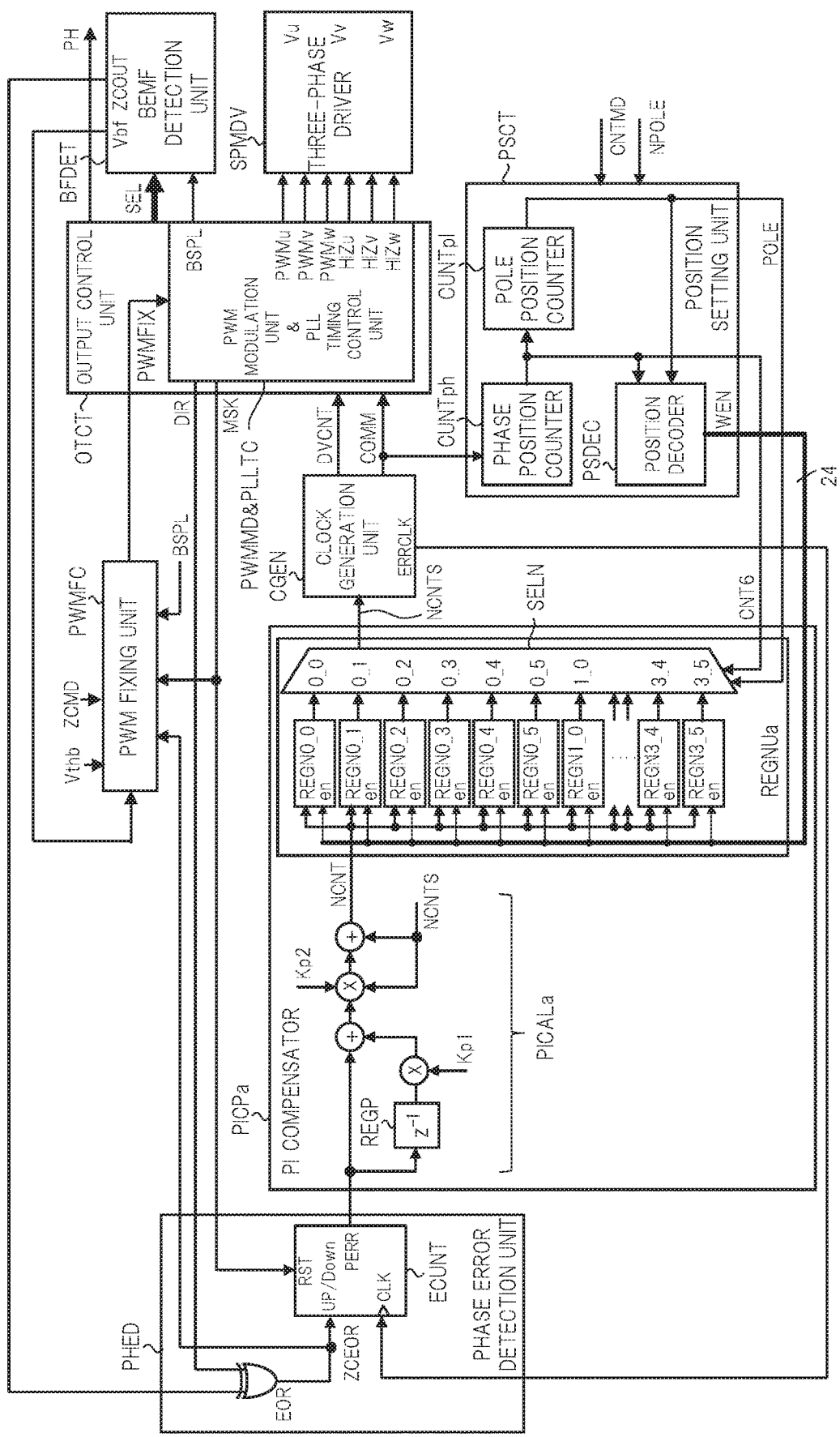
FIG. 3 is a block diagram showing a detailed configuration example around the PLL control loop in the block diagram of FIG. 2.
Figure 4:
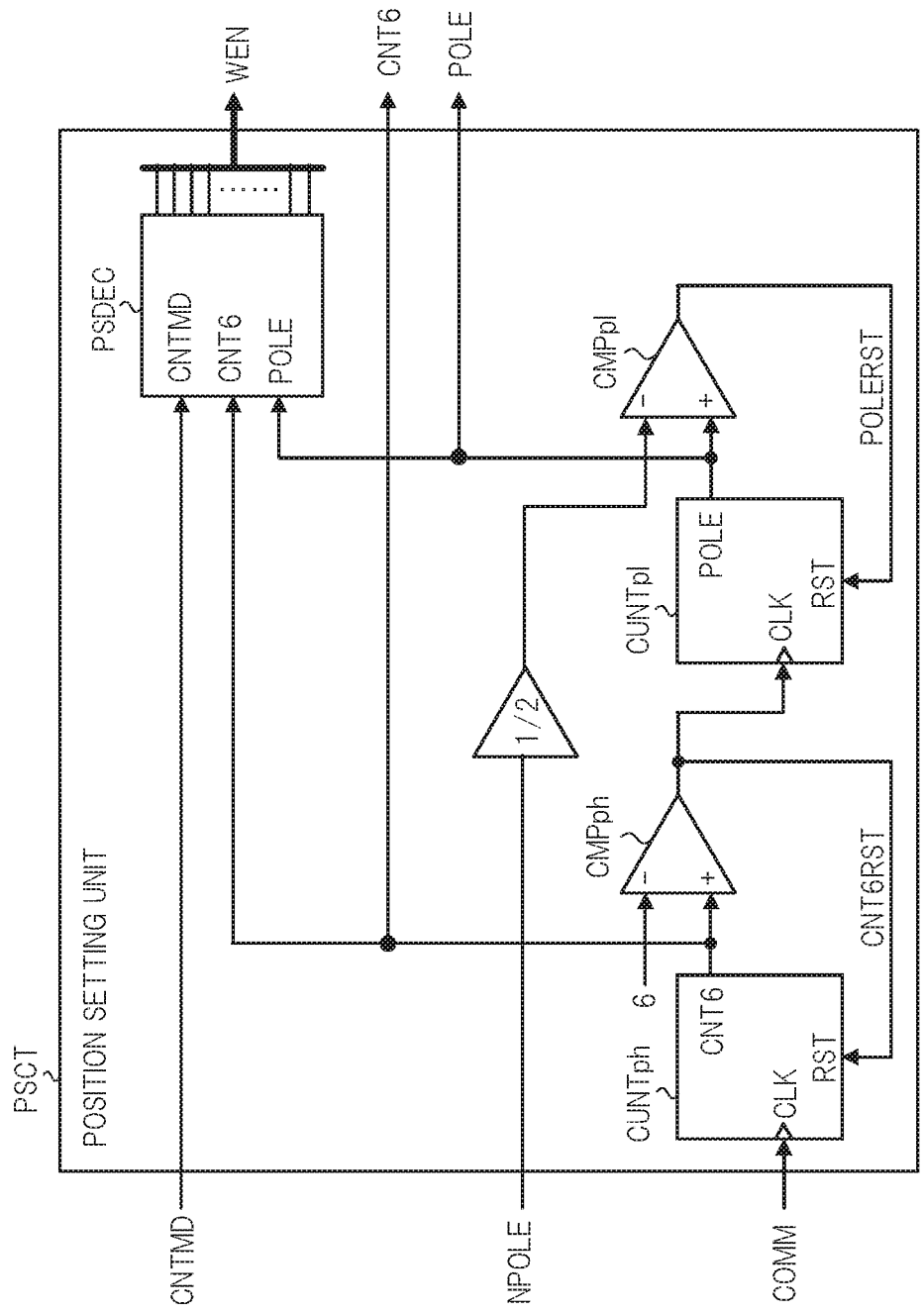
FIG. 4 is a circuit diagram illustrating a detailed configuration example of a position setting unit in the block diagram of FIG. 3.

FIG. 3 is a block diagram showing a detailed configuration example around the PLL control loop in FIG. 2. FIG. 4 is a circuit diagram showing a detailed configuration example of the position setting unit in FIG. 3. The configuration example shown in FIG. 3 differs from the configuration example shown in FIG. 21 in the inner configuration of the PI-compensator PICP. Along with this, a position setting unit PSCT is added. The PI-compensator PICP corresponds to a digital loop filter used in digital PLL control. Digital loop filters are known in various configurations and may have various state variables therein but include at least a component that reflects the previous state variable to determine the current amount of operation (cycle setting value NCNTS) and updates the state variable to reflect the next amount of operation.

The PI compensator PICPa of FIG. 3 includes a cycle setting register unit REGNUa for storing a cycle setting value NCNT(NCNTS) as one of the state variables at every detection timing instead of one cycle setting register REGN shown in FIG. 21. In this embodiment, it is assumed that the 8-pole motor shown in FIG. 18 is used, four electrical angular cycles are included in the mechanical angular cycle and six detection timings (BEMF zero crossing timings) are included in each electrical angular cycle for every electrical angle of 60° (phase switching interval).

In this instance, the cycle setting register unit REGNUa comprises 24 cycle setting registers REGN0_0, 0_1, 0_2, 0_3, 0_4, 0_5, 1_0, . . . 3_4, 3_5 corresponding to a total of 24 detection timings within the mechanical angular cycle, respectively. "x" in the cycle setting register REGNx-y represents a pole position (position of the electrical angular cycle) within the mechanical angular cycle and "y" represents a phase position within the electrical angular cycle. The cycle setting register unit REGNUa includes a selector SELN. The selector SELN selects a corresponding one of the cycle setting registers from the plurality of cycle setting registers REGN0_0 to REGN3_5 at each detection timing and outputs the cycle setting value NCNT stored in the selected cycle setting register to the clock generation unit CGEN as the cycle setting value NCNTS.

For example, it is assumed that the cycle setting register REGN0_0 is selected in accordance with a certain detection timing (t[0]) within the mechanical angular cycle (T[0]). In this instance, the cycle setting value NCNT stored in the cycle setting register REGN0_0 is outputted as the cycle setting value NCNTS and the cycle setting value NCNT is updated via the multiplier and the adder to reflect the cycle setting value NCNTS and is written into the cycle setting register REGN0_0. The cycle setting value NCNT written in the cycle setting register REGN0_0 are used at the same detection timing (t[0]) within the next mechanical angular cycle (T[1]). In this manner, the current cycle setting value NCNTS at a certain detection timing is determined by reflecting the previous cycle setting value NCNT at the same detection timing.

The position setting unit PSCT comprises a pole position counter CUNTp1, a phase position counter CUNTph and a position decoder PSDEC as shown in FIG. 3 and in particular, comparators CMPph, CMPpl as shown in FIG. 4. The phase position counter CUNTph counts the period of the phase switching signal COMM and outputs the count value as the phase position signal CNT6. The comparator CMPph outputs a pulsed signal when the phase position signal CNT6 reaches the determination value (here, "6"). The count value (CNT6) of the phase position counter CUNTph is reset in response to the pulse signal (reset signal CNT6RST).

The pole position counter CUNTp1 counts up by using the pulse signal outputted from the comparator CMPph as a trigger and outputs the count value as a pole position signal POLE. The comparator CMPp1 outputs a pulse signal when the pole position signal POLE reaches a predetermined determination value. The predetermined determination value is a half value of the number of poles setting value NPOLE and is "4" for an 8-pole motor. The count value (POLE) of the pole position counter CUNTp1 is reset in response to the pulse signal (reset signal POLERST). As a result, the pole position signal POLE cyclically outputs 0 to 3 and the phase position signal CNT6 sequentially outputs 0 to 5 for each of the values of the pole position signal POLE.

When selecting the switching mode based on the detection mode selection signal CNTMD, the position decoder PSDEC asserts any one of a plurality of write enable signals WEN (here, 24 write enable signals WEN) based on combinations of the pole position signal POLE and the phase position signal CNT6. On the other hand, when the position decoder PSDEC selects the fixed mode based on the detection mode selection signal CNTMD, for example, the position decoder fixes the pole position signal POLE and the phase position signal CNT6 to zero and commonly asserts a plurality of write enable signals WEN.

A plurality (24) of cycle setting registers REGN0_0 to REGN3_5 in FIG. 3 respectively store inputted cycle setting value NCNT in response to assertions of a plurality of write enable signals WEN. The selector SELN select one of the outputs of the cycle setting registers REGN0_0 to REGN3_5 based on combinations of the pole position signal POLE and the phase position signal CNT6.

Figure 5:
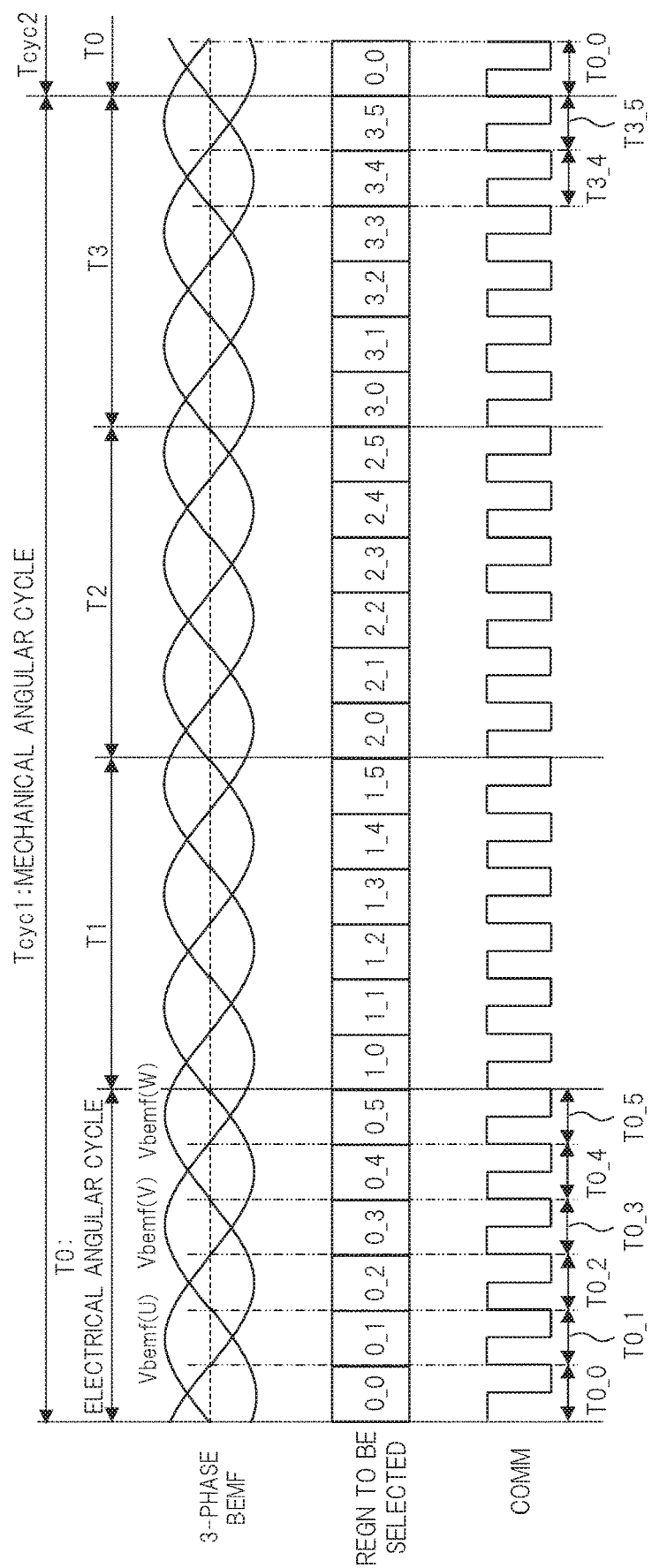
FIG. 5 is a timing chart illustrating a schematic example of operation around the PLL control loop of FIG. 3.
Figure 6:
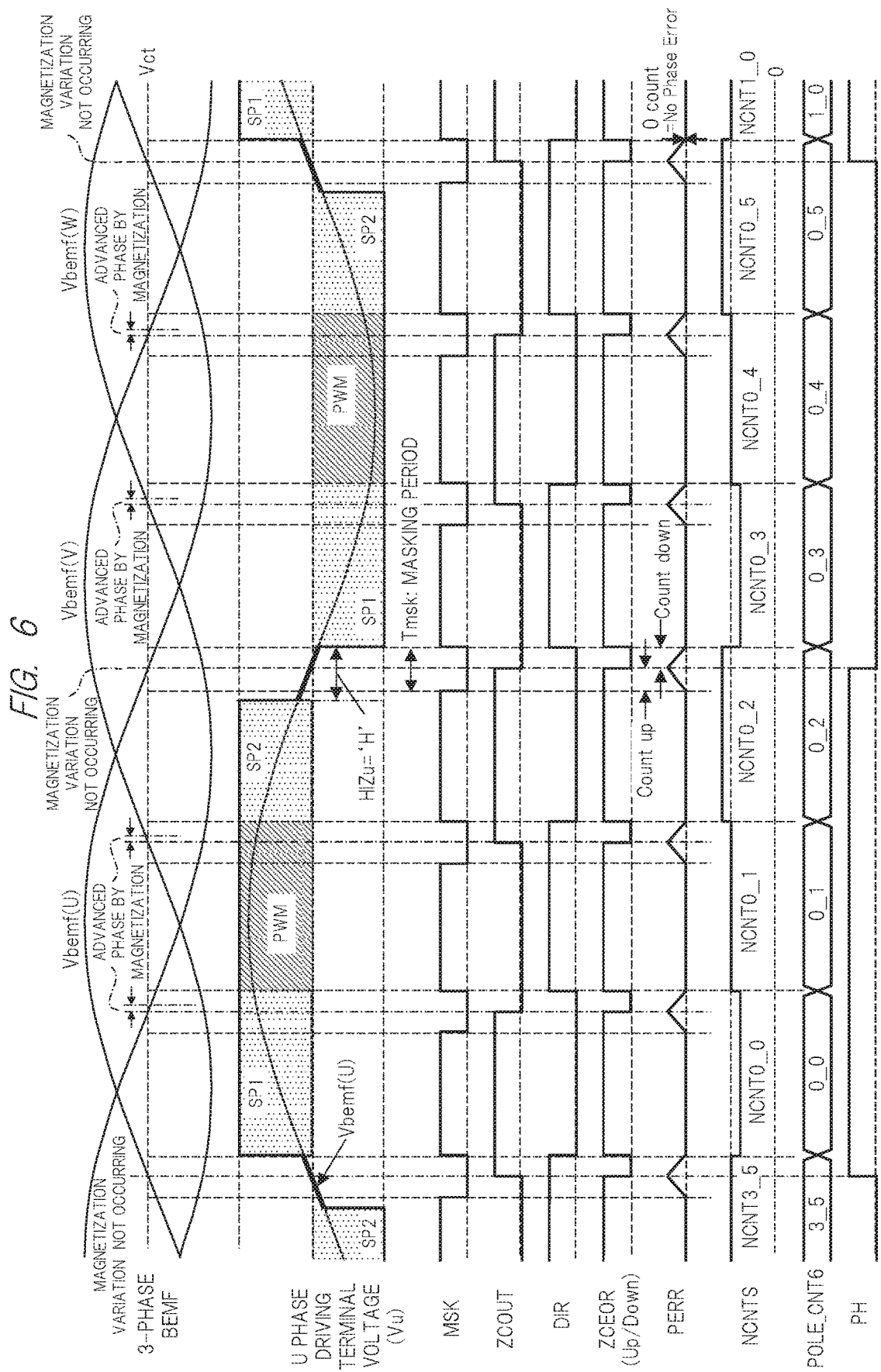
FIG. 6 is a timing chart illustrating an example of operation within one electrical angular cycle in FIG. 5.

FIG. 5 is a timing chart showing a schematic operation example around the PLL control loop of FIG. 3. FIG. 6 is a timing chart showing an operation example within one electrical angular cycle in FIG. 5. As shown in FIG. 5, in the 8-pole motor, four electrical angular cycles T0 to T3 are included in the mechanical angular cycle Tcyc1. The electrical angular cycle T0 includes six phase switching intervals T0_0 to T0_5 based on the period of the phase switching signal COMM. In the phase switching periods T0_0 to T0_5, the PI control operation using the corresponding cycle setting registers REGN0_0 to REGN0_5 is performed. Similarly, in the phase switching sections T3_0 to T3_5 (T 3_0 to T3_3 are not shown) included in the electrical angular cycle T3, the PI control operation using the corresponding cycle setting registers REGN 3_0 to REGN 3_5 is performed.

Here, when the method of the first embodiment is used, conceptually, for example, the cycle setting registers REGN0_0 to REGN0_5 store the cycle setting value NCNT reflecting the lengths of the phase switching sections T0_0 to T0_5, respectively. Then, in the mechanical angular cycle Tcyc2 following the mechanical angular cycle Tcyc1, the length of the phase switching section T0_0 included in the electrical angular cycle T0 (cycle of the phase switching signal COMM) is determined by reflecting the cycle setting value NCNT stored in the cycle setting register REGN0_0 within the mechanical angular cycle Tcyc1.

When the magnetization variation as shown in FIG. 25 occurs, for example, the interval of the zero crossing timing corresponding to the phase switching section T0_0 in the mechanical angular cycle Tcyc2 may be different from the interval of the zero crossing timing corresponding to the phase switching section T3_5 in the mechanical angular cycle Tcyc1. The PI compensator PICP' shown in FIG. 21 conceptually determines the length of the phase switching interval T0_0 by reflecting the interval of zero crossing timing corresponding to the phase switching interval T3_5. However, since the predetermined length differs from the interval of the zero crossing timing corresponding to the phase switching section T0_0 due to the magnetization variation, a phase error PERR occurs as shown in FIG. 25.

On the other hand, even when such variation in magnetization occurs, the interval of the zero crossing timing corresponding to the phase switching section T0_0 in the mechanical angular cycle Tcyc2 and the interval of the zero crossing timing corresponding to the phase switching section T0_0 in the mechanical angular cycle Tcyc1 are the same. The PI compensator PICP shown in FIG. 3 conceptually determines the length of the phase switching interval T0_0 in the mechanical angular cycle Tcyc2 by reflecting the interval of the zero crossing timing corresponding to the phase switching interval T0_0 in the mechanical angular cycle Tcyc1. As a result, the phase error PERR can be suppressed and ideally, can be zeroed.

FIG. 6 shows a detailed operation example in the electrical angular cycle T0 of FIG. 5 and shows an operation example in the case where magnetization variation occurs as in the case of FIG. 25. In FIG. 6, similarly to FIG. 25, the detection of the phase error PERR is performed with the zero crossing timing of the rising edge of the three-phase BEMF occurring three times in the electrical angular cycle and the zero crossing timing of the falling edge occurring three times in the electrical angular cycle as the detection timings. At each detection timing, magnetization variation occurs as in the case of FIG. 25 but, unlike the case of FIG. 25, the phase error PERR is zero.

Figure 7:
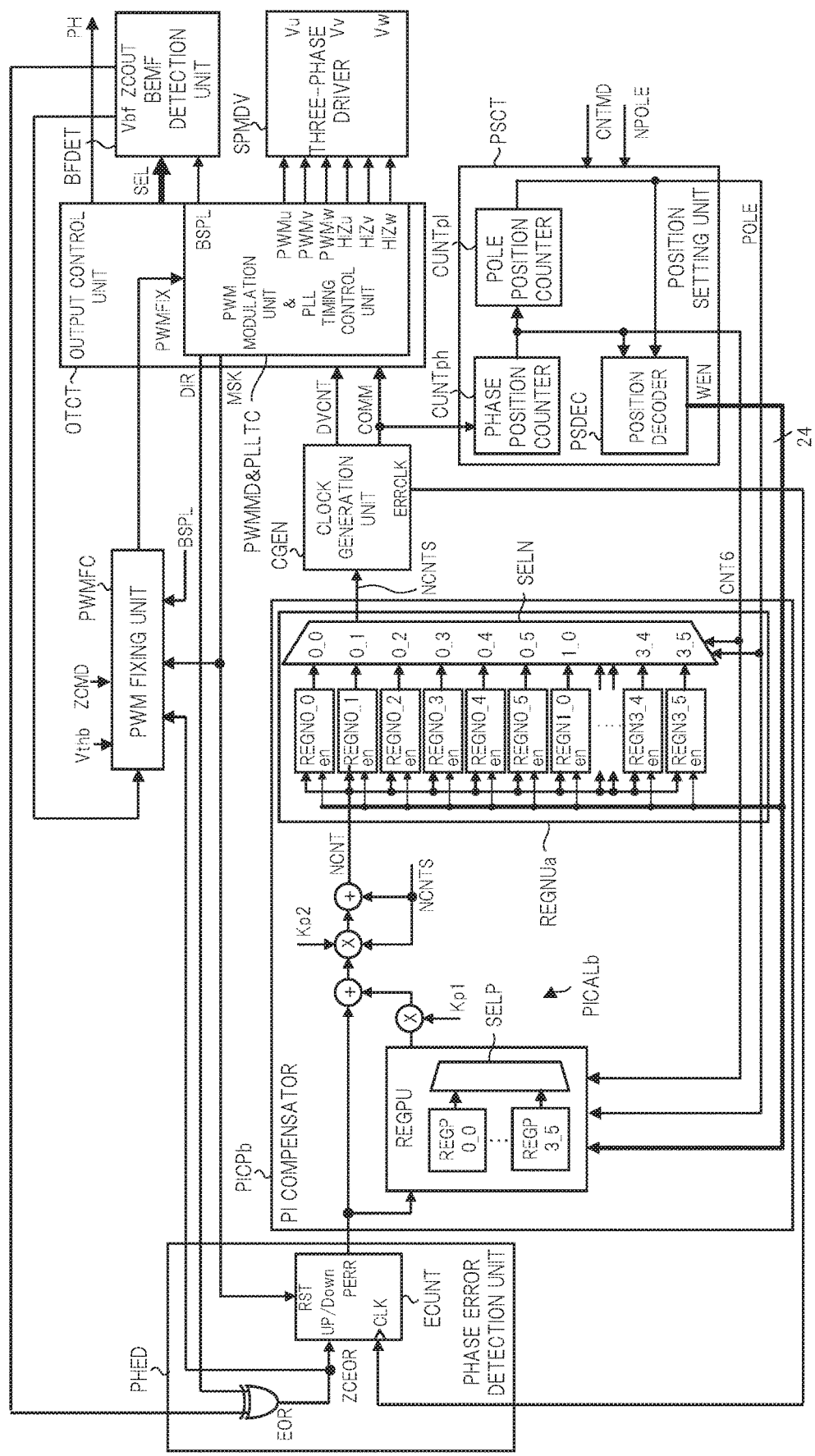
FIG. 7 is a block diagram illustrating an example of a configuration in which the PLL control loop in FIG. 3 is deformed.

FIG. 7 is a block diagram showing a configuration example in which the PLL control loop of FIG. 3 is modified. The configuration example of FIG. 7 differs from the configuration example of FIG. 3 in the configuration of the PI compensator PICPb. The PI compensator PICPb comprises a phase error register unit REGPU instead of one phase error register REGP in the PI compensator PICPa of FIG. 3. The phase error register unit REGPU includes 24 phase error registers REGP0_0 to REGP3_5 corresponding to a total of 24 detection timings in the mechanical angular cycle, similarly to the cycle setting register unit REGNUa. The storage of the phase error PERR in the phase error registers REGP0_0 to REGP3_5 is controlled by the write enable signal WEN in the same manner as in the cycle setting register of FIG. 3.

The phase error register unit REGPU includes a selector SELP. As in the selector SELN of FIG. 3, the selector SELP selects a corresponding one of the plurality of phase error registers REGP0_0 to REGP3_5 at each detection timing, and outputs the phase error PERR stored in the selected phase error register. As a result, the PI compensator PICPb stores the phase error PERR, which is the other one of the state variables, in the corresponding one of the phase error registers at each of the plurality of detection timings in the previous mechanical angular cycle. Then, the PI compensator PICPb reflects the phase error PERR stored in the corresponding one of the phase error registers for each of the plurality of detection timings in the current mechanical angular cycle and determines the cycle setting value (the amount of operation) NCNT in the current mechanical angular cycle.

As described above, although the PI compensator can be realized in various configurations, in this embodiment, the PI compensator is configured to determine (calculate) the present cycle setting value NCNT (NCNTS by reflecting the previous phase error PERR) and the previous cycle setting value NCNT (NCNTS). Therefore, in order to perform the PI control strictly, as in the case of the previous phase error PERR, the phase error PERR at the corresponding detection timing in the previous mechanical angular cycle needs to be used instead of the detection timing before the phase switching interval (electrical angle of 60°) as in the case of the cycle setting value NCNT(NCNTS).

Therefore, in FIG. 7, a phase error register unit REGPU is provided. When the method of the first embodiment is used, as shown in FIG. 6, it is considered that the phase error PERR at the respective detection timings are both close to zero. Therefore, even in the configuration example of FIG. 3, a practical problem does not occur in particular. By using the configuration example of FIG. 3, the area overhead can be reduced as compared with the configuration example of FIG. 7. However, for example, in an application in which load fluctuation or the like is frequent, if one phase error register REGP is used as shown in FIG. 3, the phase error caused by load fluctuation and the phase error caused by magnetization fluctuation is confused and stored in the phase error register REGP. Therefore, when the configuration example of FIG. 7 is used, the component of the phase error due to the magnetization variation can be eliminated from the stored value of each phase error register, and therefore, it is considered that a more stable control operation can be performed as compared with the configuration example of FIG. 3.

As described above, when the method of the first embodiment is used, even when the magnetization variation occurs, the phase error PERR inputted to the PLL control unit (PI compensator) can be made close to zero. In this state, the three-phase motor SPM is driven in a state close to the ideal state shown in FIG. 19, that is, a state in which the phase of the BEMF and the conduction timings are always substantially synchronized with each other. As a result, even when magnetization variation occurs, it is possible to reduce rotational jitter.

Further, as shown in FIGS. 3 and 4, by allowing the switching mode and the fixed mode to be selected by the detection mode selection signal CNTMD, it is possible to cope with high-speed responses such as when the motor is started. That is, for example, it is possible to perform an efficient operation such as selecting a fixed mode during a period in which a high-speed response is important instead of a rotational jitter and thereafter selecting a switching mode during a period of a steady-state rotation in which a reduction of the rotational jitter is important, such as at the time of starting a motor. Here, in the fixed mode, the same cycle setting value NCNT is stored in all the cycle setting registers REGN0_0 to REGN3_5 by the control of the write enable signal WEN as described with reference to FIG. 4. As a result, since the initial values of the cycle setting registers REGN0_0 to REGN3_5 are set to appropriate values to some extent at the time of subsequently shifting to the switching mode, it is possible to smoothly shift to the operation of the switching mode.

Here, in the 8-pole motor, the phase error PERR is detected at a total of 24 detection timings included in the mechanical angular cycle. Since the magnetization variation is caused by mechanical factors, it has a periodicity of a mechanical angle of 360°. In addition, at each detection timing within the mechanical angular cycle, the occurrence state of magnetization variation may differ individually. Therefore, it is desired to detect the phase error PERR at a total of 24 detection timings. However, in this case, it is necessary to provide a total of 24 high impedance periods (i.e. non-conduction periods) within the mechanical angular cycle. Since the non-conduction period causes disturbance of the driving current waveform, the non-conduction period may be desired to be reduced.

In such cases, for example, the falling zero crossing of the u phase, the v phase and the w phase may be excluded and the phase error PERR may be detected (i.e. the phase error PERR may be detected at an interval of 120° electrical angular) with the rising zero crossing as an object. In this case, for example, the write enable signal WEN corresponding to every other cycle setting register REGN0_1, 0_3, 0_5, . . . may be fixed to the negate level. In addition, the PLL timing control unit PLLTC of FIG. 24 may be configured to control the high-impedance signal HIZ and the masking signal MSK based on the OR operation result of the write enable signals WEN (HIZ='L' and MSK='H' when the OR operation result is 'L' level).

Also, in some cases, for example, it is possible to target only the rising zero crossing of the u phase and not the others, or to target only the falling zero crossing of the u phase and not the others. For example, with respect to the former, in the mechanical angular cycle of the "2×N (N is an integer of 2 or more)" pole motor, the occurrence state of magnetization variation may be different in each of the N rising zero crossings of the u phase, which may occur every electrical angular cycle. Therefore, by applying the method of the first embodiment, an effect of reducing rotational jitter can be obtained as compared with the configuration example of FIG. 21.

In addition, in the switching mode, in a state where the steady-state rotation is maintained, the stored values of the cycle setting registers REGN 0_0 to REGN3_5 are substantially constant, ideally unchanged. Therefore, in the switching mode, the feedback control by the PLL does not necessarily have to be always in the enable state. Specifically, the PLL control loop can perform the operations as shown in FIGS. 5 and 6, for example, only during an initial period after the steady-state rotation is reached, or intermittently thereafter.

In this instance, the PLL control loop searches for an appropriate cycle setting value NCNT for each of the cycle setting registers REGN0_0 to REN3_5 by an operation as shown in FIGS. 5 and 6, for example, in an initial period or the like, and then fixes the write enable signal WEN at an 'L' level, for example. In response to this, the PLL timing control unit PLLTC fixes the high-impedance signal HIZ to the 'L' level and the masking signal MSK to the 'H' level. In this condition, the PLL control loop may generate the phase switching signal COMM by using the search values of the cycle setting registers REGN0_0 to REN3_5. Thus, the influence of the non-conduction period can be reduced.

Second Embodiment

Figure 8:
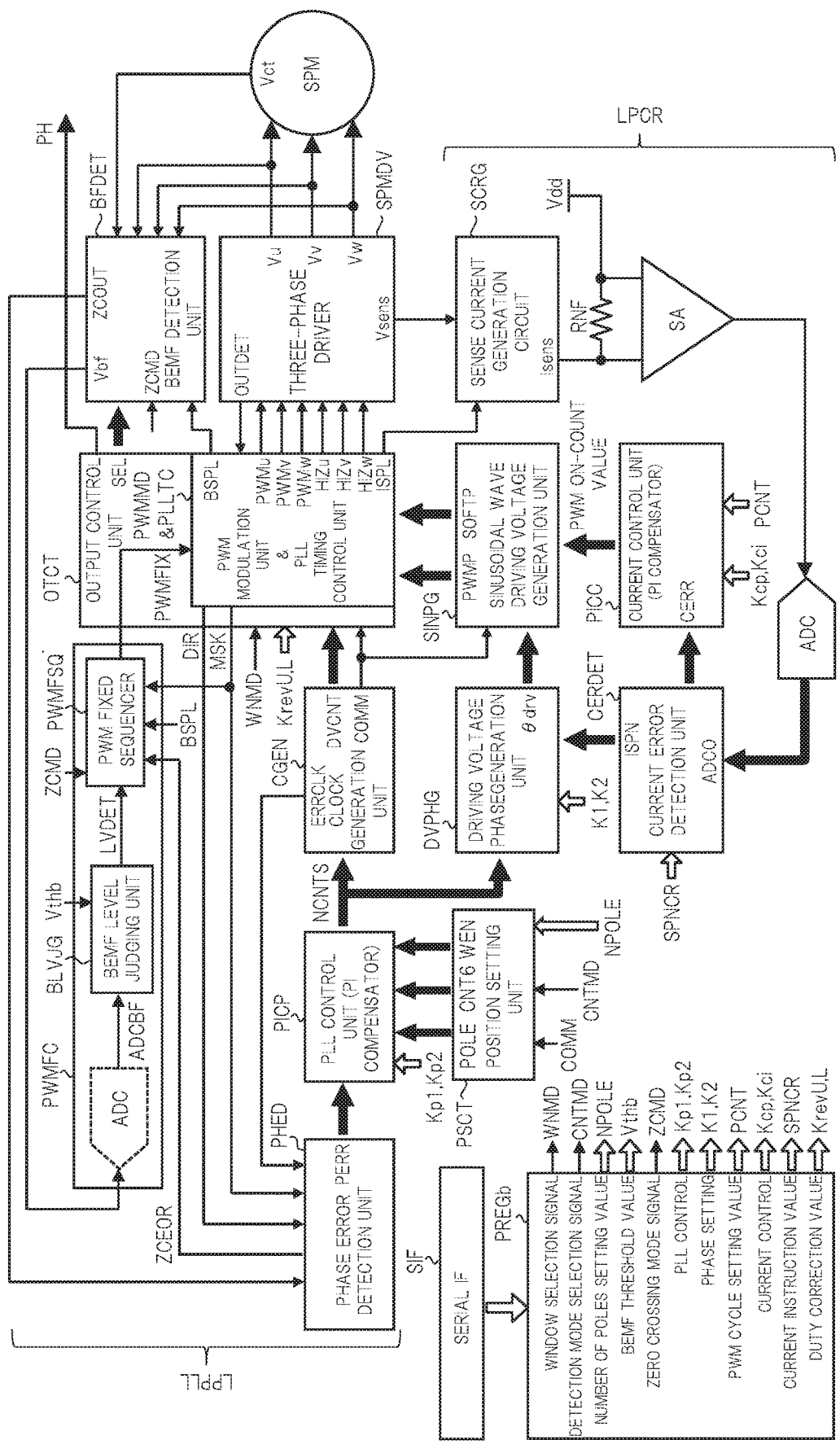
FIG. 8 is a block diagram illustrating a schematic configuration example of a motor driving apparatus according to the second embodiment of the present invention.

FIG. 8 is a block diagram showing a schematic configuration example of a motor driving apparatus according to Embodiment 2 of the present invention. The motor driving apparatus shown in FIG. 8 is different from the motor driving apparatus shown in FIG. 2 in that the parameter setting register PREGb outputs the window selection signal WNMD and that the window selection signal WNMD is input to the output control unit OTCT, specifically, the PLL timing control unit PLLTC.

Figure 9:
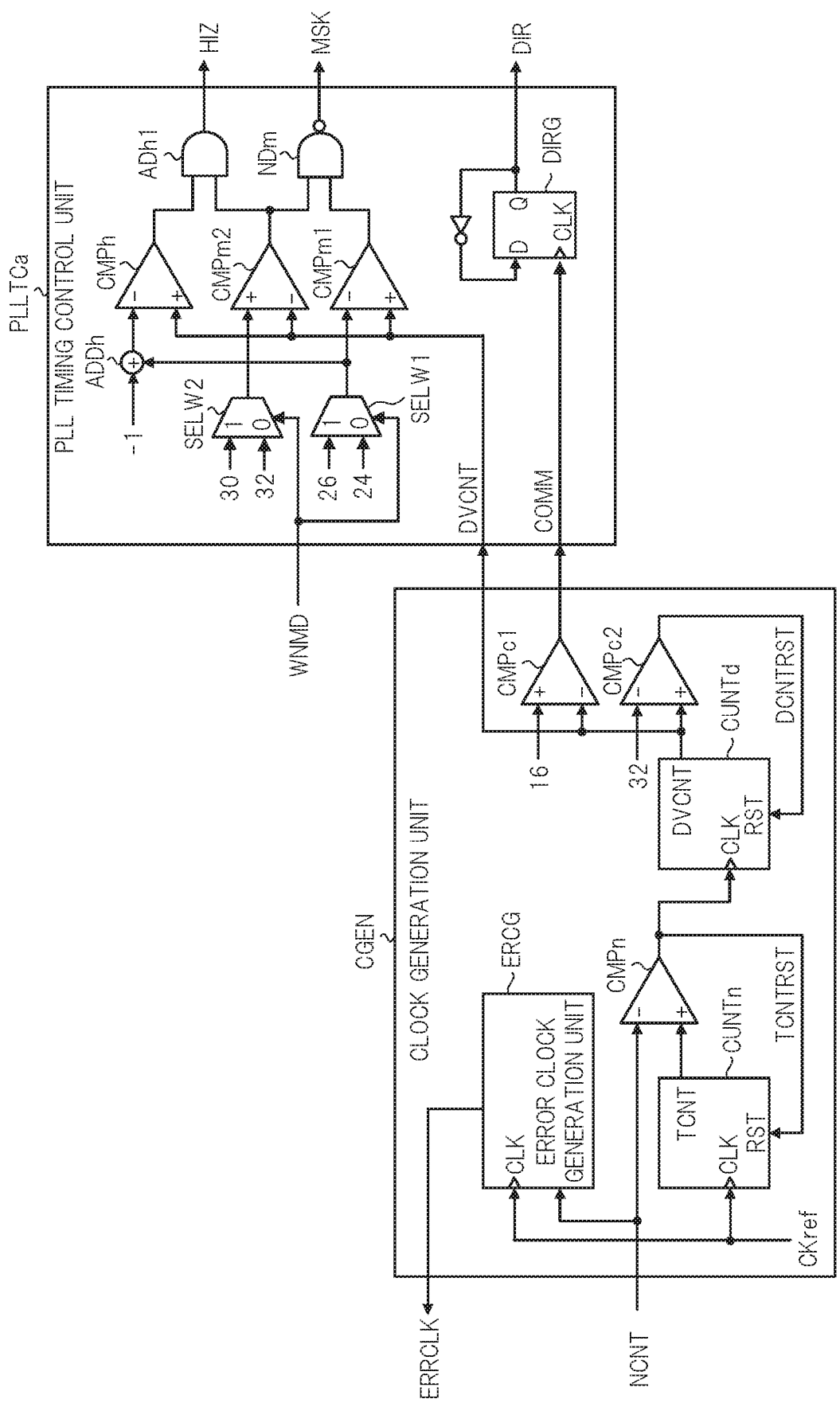
FIG. 9 is a circuit diagram illustrating an example of a configuration around the PLL timing control unit in FIG. 8.

FIG. 9 is a circuit diagram showing a configuration example around the PLL timing control unit in FIG. 8. The PLL timing control unit PLLTCa shown in FIG. 9 has selectors SELW1, SELW2 added to the PLL-timing control unit shown in FIG. 24. The selectors SELW1, SELW2 function as a variable setting unit that variably sets the length of the assertion period (masking period Tmsk) of the masking signal MSK and the length of the assertion period (high impedance period) of the high impedance signal HIZ in accordance with the window selection signal WNMD.

In this embodiment, the selectors SELW1, SELW2 set the determination values of the comparators CMPm1, CMPm2 to "24" and "32", respectively, when the window selection signal WNMD is at the "L" level ('0' level) (referred to as the normal window mode). In this case, the PLL timing control unit PLLTCa performs the same operation as in the case of FIG. 24. On the other hand, when the window selection signal WNMD is at the "H" level ('1' level) (referred to as the shortened window mode), the selectors SELW1, SELW2 set the determination values of the comparators CMPm1, CMPm2 to "26" and "30", respectively. As a result, the length of the masking period Tmsk is ½, and the length of the high-impedance period is about ½.

In PLL control loop, the BEMF zero crossing timing needs to be included at least in the masking period Tmsk (and the high-impedance period) to detect the phase error PERR. When the variation in magnetization occurs, the phase of the zero crossing timing varies, and therefore, the length of the masking period Tmsk needs to be ensured to a large extent by the amount of the variation. On the other hand, when the switching mode described in the first embodiment is used, even when the magnetization variation occurs, the zero crossing timing can be maintained at the reference timing (center timing) within the masking period Tmsk. As a result, the length of the masking period Tmsk and the high-impedance period can be shortened.

Figure 10:
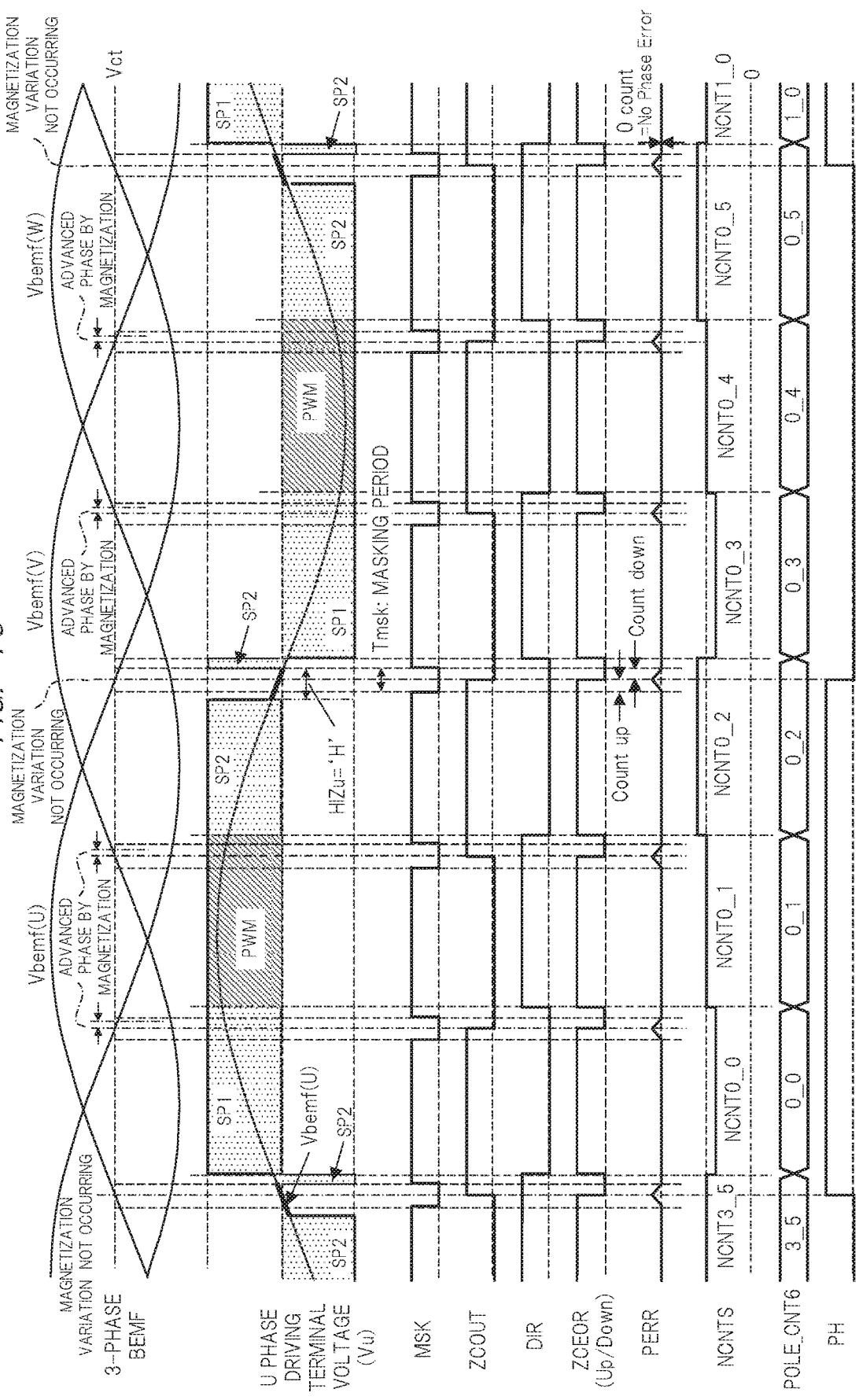
FIG. 10 is a timing chart illustrating an example of the operation of the motor driving apparatus of FIG. 8 and FIG. 9.

FIG. 10 is a timing chart showing an example of the operation of the motor driving apparatus shown in FIGS. 8 and 9. FIG. 10 shows an exemplary operation in the shortened window mode, in which the length of the masking period Tmsk and the length of the high-impedance period are both shortened as compared with the case of FIG. 6. Along with the shortening of the high impedance period, for example, the driving terminal voltage Vu based on the SP2 pattern is generated in the u-phase driving terminal in the period of the difference before and after the shortening. As described above, in FIG. 10, the non-conduction period is shortened as compared with the case of FIG. 6 and the conduction period is expanded accordingly. As an actual method of using the window selection signal WNMD, for example, until the three-phase motor SPM reaches the steady-state rotation and stabilizes to some extent the steady-state rotation, the normal window mode may be used and the shortened window mode may be switched to the shortened window mode at a stage where the three-phase motor SPM is stabilized to some extent.

As described above, by using the method of the second embodiment, in addition to the various effects described in the first embodiment, the torque ripple can be further reduced and consequently, the noise and vibration of the three-phase motor SPM can be reduced. That is, the high impedance period (non-conduction period) causes an increase in torque ripple, which may be a cause of noise or vibration of the three-phase motor SPM, but by shortening the non-conduction period, such a problem can be alleviated.

Third Embodiment

Figure 11:
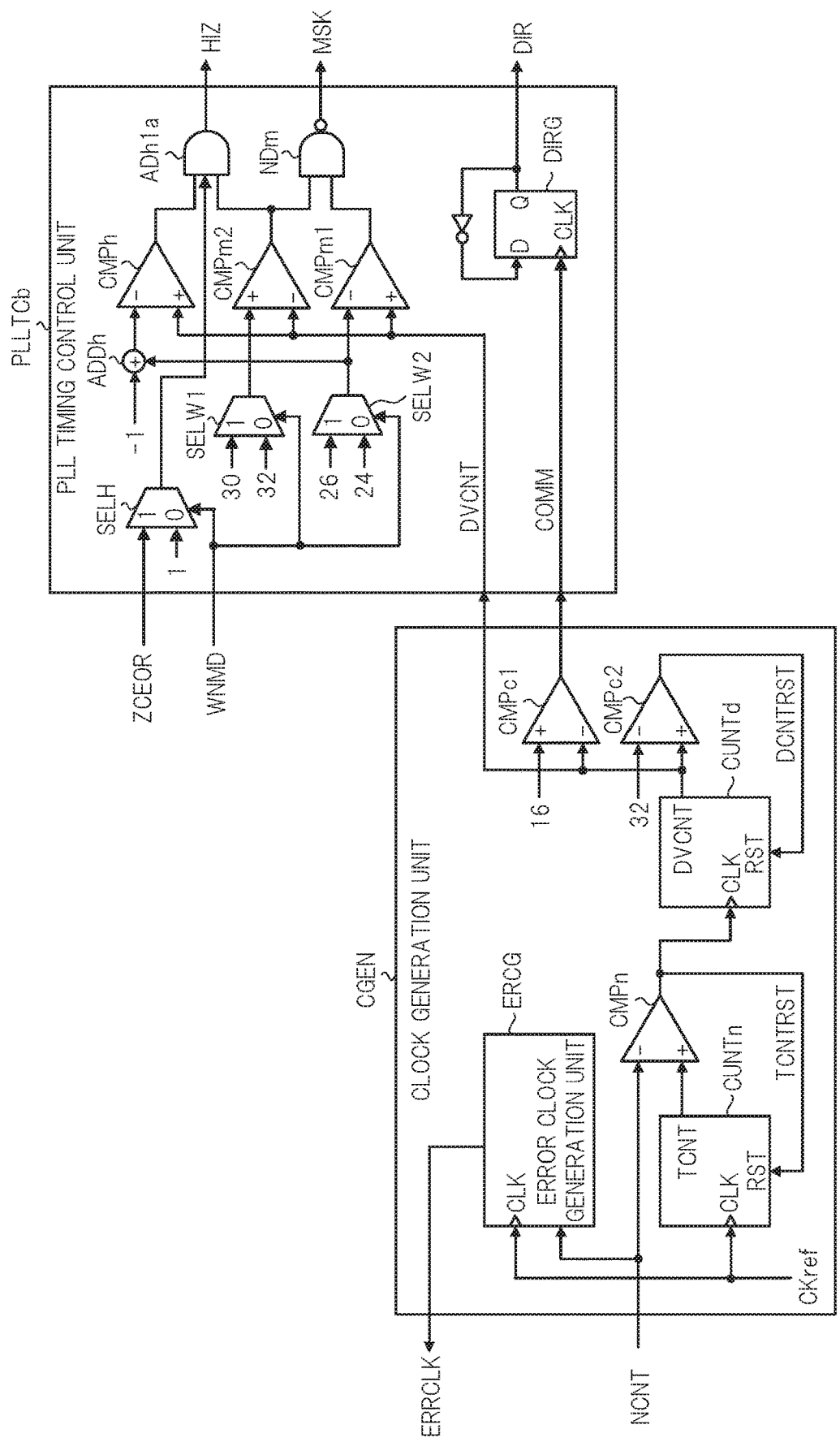
FIG. 11 is a circuit diagram illustrating a configuration example around the PLL timing control unit in a motor driving apparatus according to the third embodiment of the present invention.

FIG. 11 is a circuit diagram showing a configuration example around the PLL timing control unit in the motor driving apparatus according to the third embodiment of the present invention. In the PLL timing control unit PLLTCb shown in FIG. 11, a selector SELH is added to the configuration shown in FIG. 9 and the AND gate ADh1a for generating the high-impedance signal HIZ is changed from 2 inputs to 3 inputs. The selector SELH outputs signals to one input to which the AND gate ADh1a is added. The selector SELH and the AND gate ADh1a function as a high-impedance releasing unit that releases the high-impedance state when the timing of the rising zero crossing or the timing of the falling zero crossing of the BEMF occurs.

In this embodiment, the selector SELH outputs an "H" level which is a fixed level when the window selection signal WNMD is at an "L" level (normal window mode). In this case, the same operation as that in FIG. 24 is performed. On the other hand, when the window selection signal WNMD is at the "H" level (shortened window mode), the selector SELH selects and outputs the zero crossing EOR signal ZCEOR from the phase error detection unit PHED in the PLL control loop. As a result, the AND gate ADh1a negates the high-impedance signal HIZ to the "L" level (releases the high-impedance condition) at the time when the zero crossing EOR signal ZCEOR is asserted to the "L" level (i.e. at the time when the zero crossing timing occurs).

Figure 12:
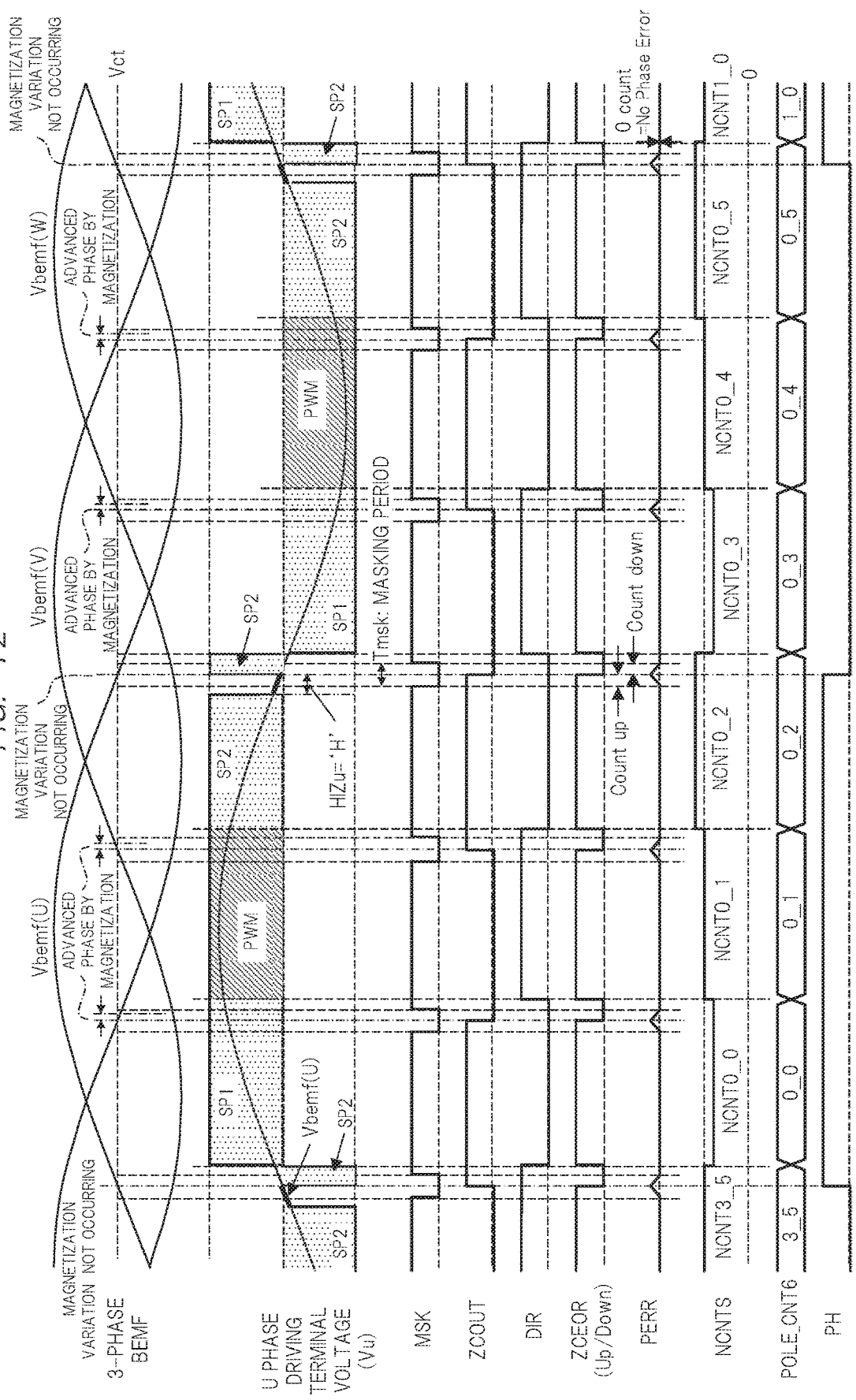
FIG. 12 is a timing chart illustrating an example of an operation of a motor driving apparatus equipped with a PLL timing control unit in FIG. 9.

FIG. 12 is a timing chart showing an example of the operation of the motor driving apparatus provided with the PLL timing control unit of FIG. 9. In FIG. 12, the length of the masking period Tmsk is the same as that in FIG. 10, but the length of the high impedance period is shortened by the high impedance releasing unit described above. Along with the shortening of the high impedance period, in FIG. 12, the non-conduction period is further shortened as compared with the case of FIG. 10 and the conduction period (in this example, the application period of the u-phase driving terminal voltage Vu based on the SP2 pattern) is expanded accordingly.

After the detection of the zero crossing timing within the masking period Tmsk, in particular, the BEMF needs not be monitored but only the counting down operation of the error counters ECUNT is performed by the phase error detection unit PHED. Therefore, if the masking period Tmsk is maintained, the high-impedance state is released in accordance with the zero crossing timing and the conduction is restarted without any particular problems.

As described above, by using the method of the third embodiment, in addition to the various effects described in the second embodiment, the torque ripple can be further reduced and as a result, the three-phase motor SPM can be further reduced in noise and vibration. Note that the method of the third embodiment can be used in combination with the operation example of FIG. 6 or the operation example of FIG. 25 in some cases. However, when combined with the operation example of FIG. 25, since the zero crossing timing fluctuates with respect to the reference timing within the masking period Tmsk due to the influence of the magnetization variation, the effect of torque ripple reduction may differ for each phase switching period. In this respect, it is desirable to apply the present invention to the operation example of FIG. 10 or the operation example of FIG. 6.

Fourth Embodiment

Figure 13:
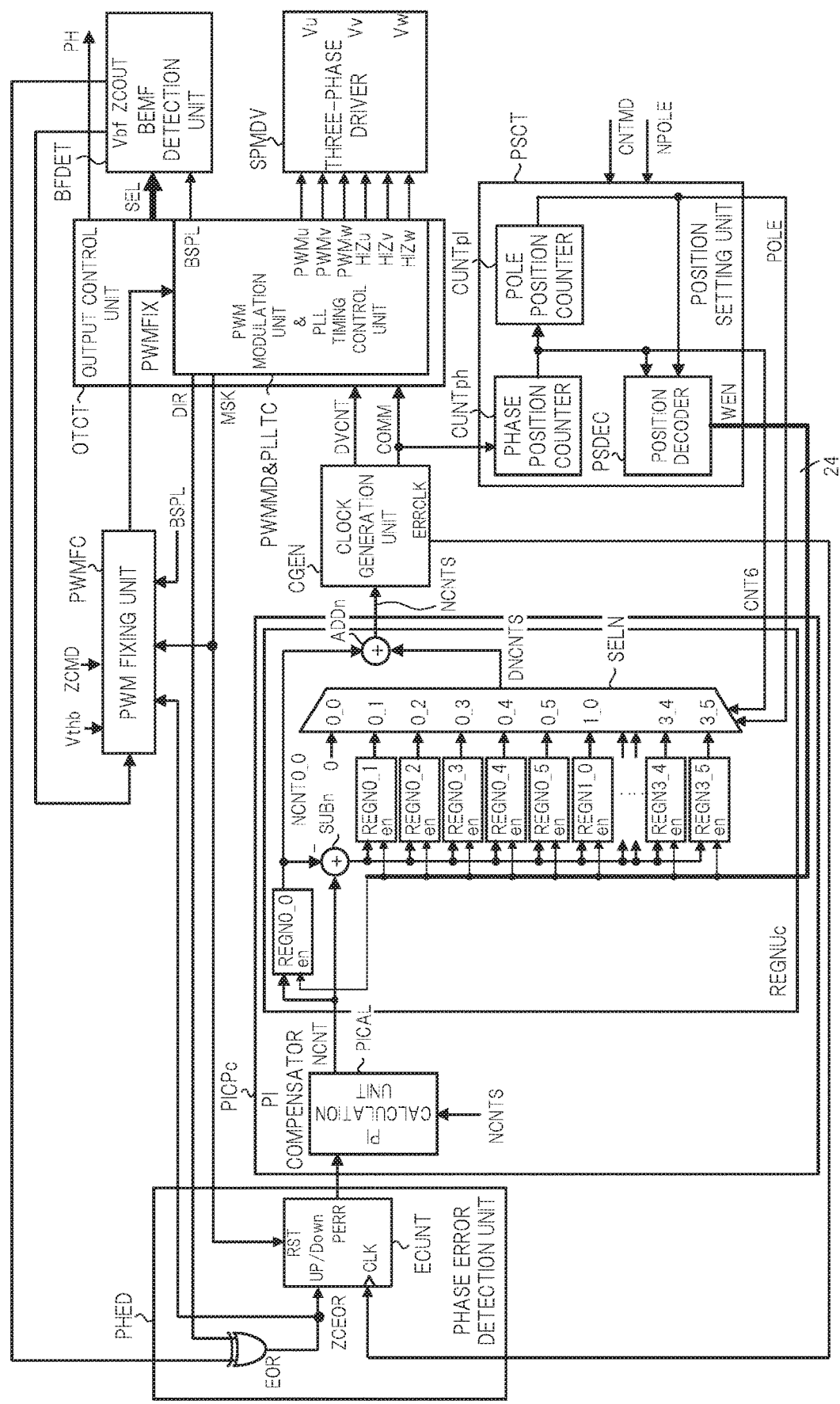
FIG. 13 is a block diagram illustrating a detailed configuration example around the PLL control loop in a motor driving apparatus according to an embodiment 4 of the present invention in FIG. 2.

FIG. 13 is a block diagram showing a detailed configuration example around the PLL control loop of FIG. 2 in the motor driving apparatus according to the fourth embodiment of the present invention. The configuration example shown in FIG. 13 differs from the configuration example shown in FIG. 3 in the configuration of the cycle setting register unit REGNUc in the PI compensator PICPc. In the PI compensator PICPc, the PI calculation unit PICAL corresponds to the PI calculation units PICALa, PICALb shown in FIGS. 3 and 7.

In the PI compensator PICPc, unlike the configuration of FIG. 3, one of the cycle setting registers REGN0_0 to REGN3_5 (here, REGN0_0) is defined as a reference register. Furthermore, the PI compensator PICPc comprises a subtractor SBn and an adder ADDn. The subtractor SBn calculates a difference value between a state variable (here, the cycle setting value NCNT) updated at each of a plurality of detection timings and a state variable (cycle setting value NCNT) stored in the reference register.

When the reference register is selected based on the write enable signal WEN, the reference register REGN0_0 stores the cycle setting value NCNT from the PI calculation unit PICAL, similarly to the configuration example of FIG. 3. On the other hand, when one cycle setting register (REGN0_1 to REGN3_5) excluding the reference register is selected based on the write enable signal WEN, the subtractor SBn stores the calculated difference value in the selected one cycle setting register.

When one register excluding the reference register is selected by the selector SELN, the adder ADDn adds the difference value from the one register and the state variable (cycle setting value NCNT) stored in the reference register and outputs the addition result as the cycle setting value NCNTS. On the other hand, when the reference register is selected by the selector SELN, the selector SELN outputs "0" as the fixed input value and in response to this, the adder ADDn outputs the state variable (cycle setting value NCNT) stored in the reference register as the cycle setting value NCNTS as it is.

By using the method of the fourth embodiment, in addition to the various effects described in the first embodiment, the bit widths of the cycle setting registers (REGN0_1 to REGN3_5) except for the reference register (REGN0_0) are narrowed along with the storage of the difference values so that the cycle setting register unit REGNUc can be reduced in area and costs. The method of the fourth embodiment can also be applied to the phase error register unit REGPU of FIG. 7.

Fifth Embodiment

Figure 14:
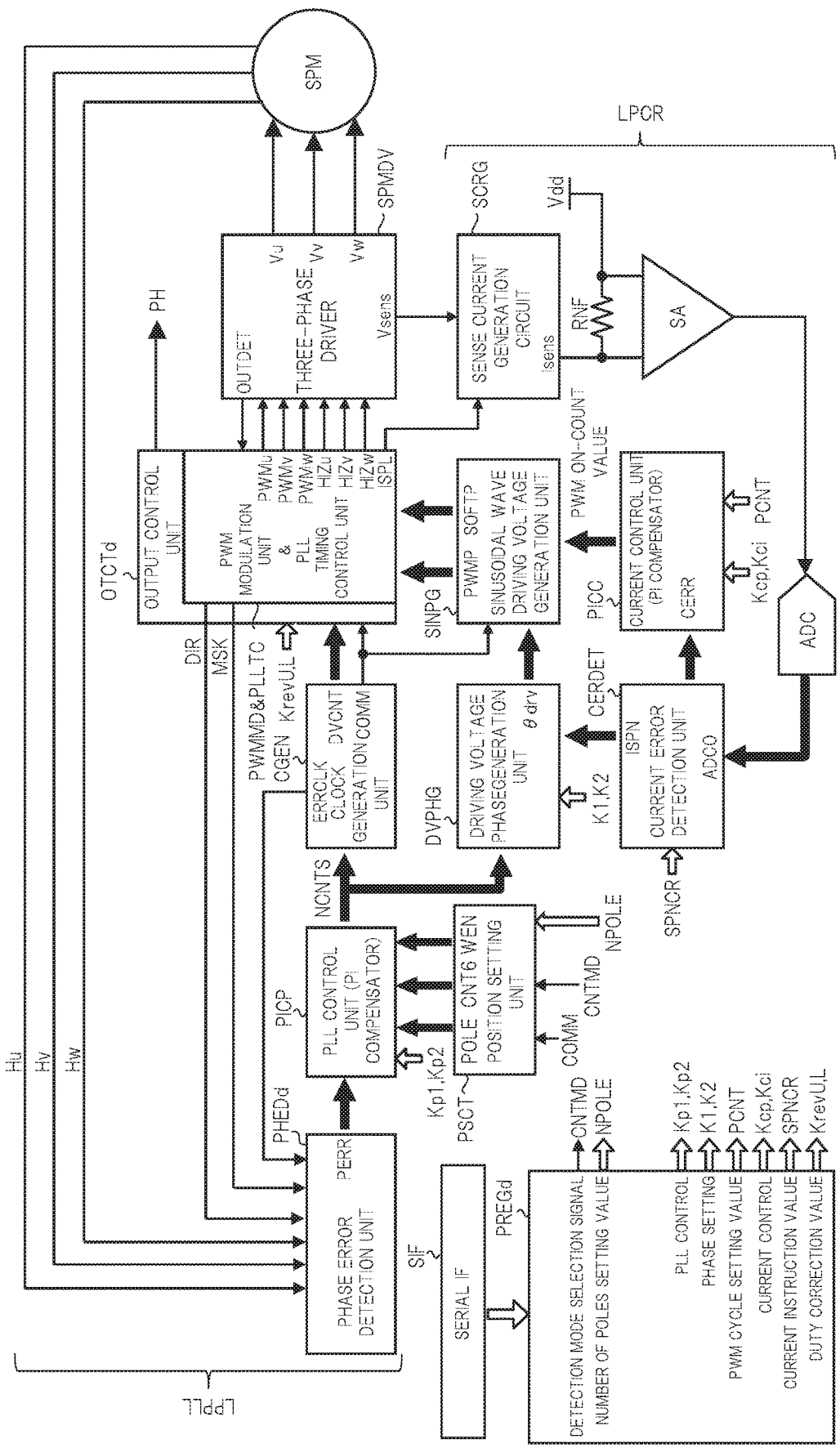
FIG. 14 is a block diagram illustrating a schematic configuration example of a motor driving apparatus according to the fifth embodiment of the present invention.

FIG. 14 is a block diagram showing a schematic configuration example of a motor driving apparatus according to Embodiment 5 of the present invention. In the above-described embodiments, examples of application to a position sensor-less motor for detecting BEMF have been described, but the method of the embodiment is not limited to a position sensor-less motor and can be applied to a motor with a position sensor. FIG. 14 shows, as an example, a motor driving apparatus for a three-phase motor SPM which outputs three-phase Hall signals Hu, Hv and Hw as three-phase position detection signals by a Hall element serving as a position sensor. The three-phase position detecting signal from the position sensor is not limited to a Hall signal and may be various signals such as a UVW signal from an Resolver Digital Converter.

The motor driving apparatus shown in FIG. 14 does not have the BFMF detection unit BFDET and the PWM fixing unit PWMFC because the position is detected using the Hall signals Hu, Hv and Hw, unlike the configuration shown in FIG. 2. As a result, the configurations of the phase error detection unit PHEDd and the output control unit OTCTd are slightly different from those of the configuration shown in FIG. 2 and the BEMF threshold value Vthb and the zero crossing mode signal ZCMD are deleted from the output of the parameter setting register PREGd. The phase error detection unit PHEDd detects the phase error PERR using the Hall signals Hu, Hv and Hw instead of the zero crossing signal ZCOUT in FIG. 2. Unlike the configuration of FIG. 2, the output control unit OTCTd does not output the BEMF sampling signal BSPL or the phase selection signal SEL, nor does it perform an operation corresponding to the PWM-fixed signal PWMFIX.

Figure 15:
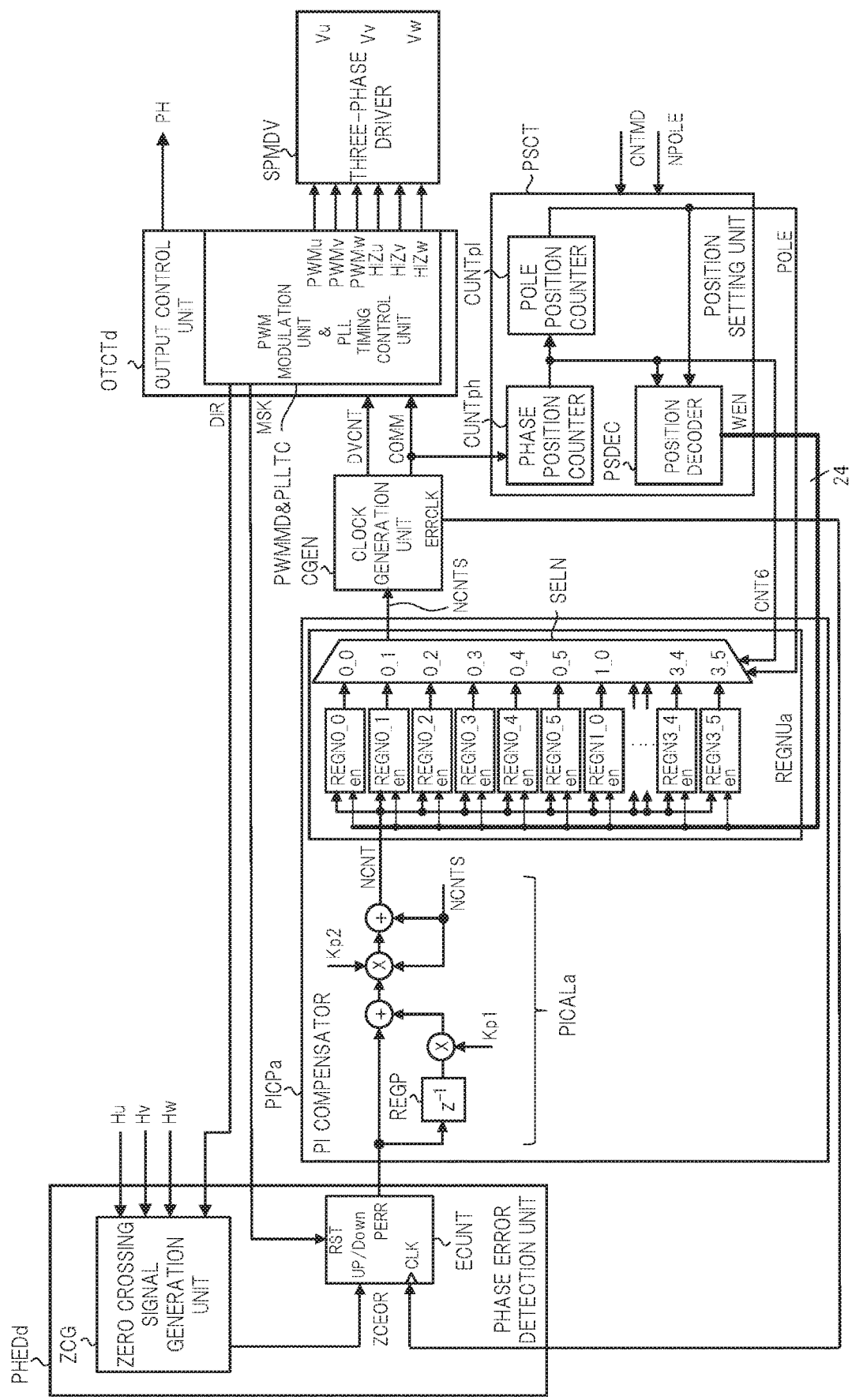
FIG. 15 is a block diagram illustrating a detailed configuration example around a PLL control loop in FIG. 14.
Figure 16:
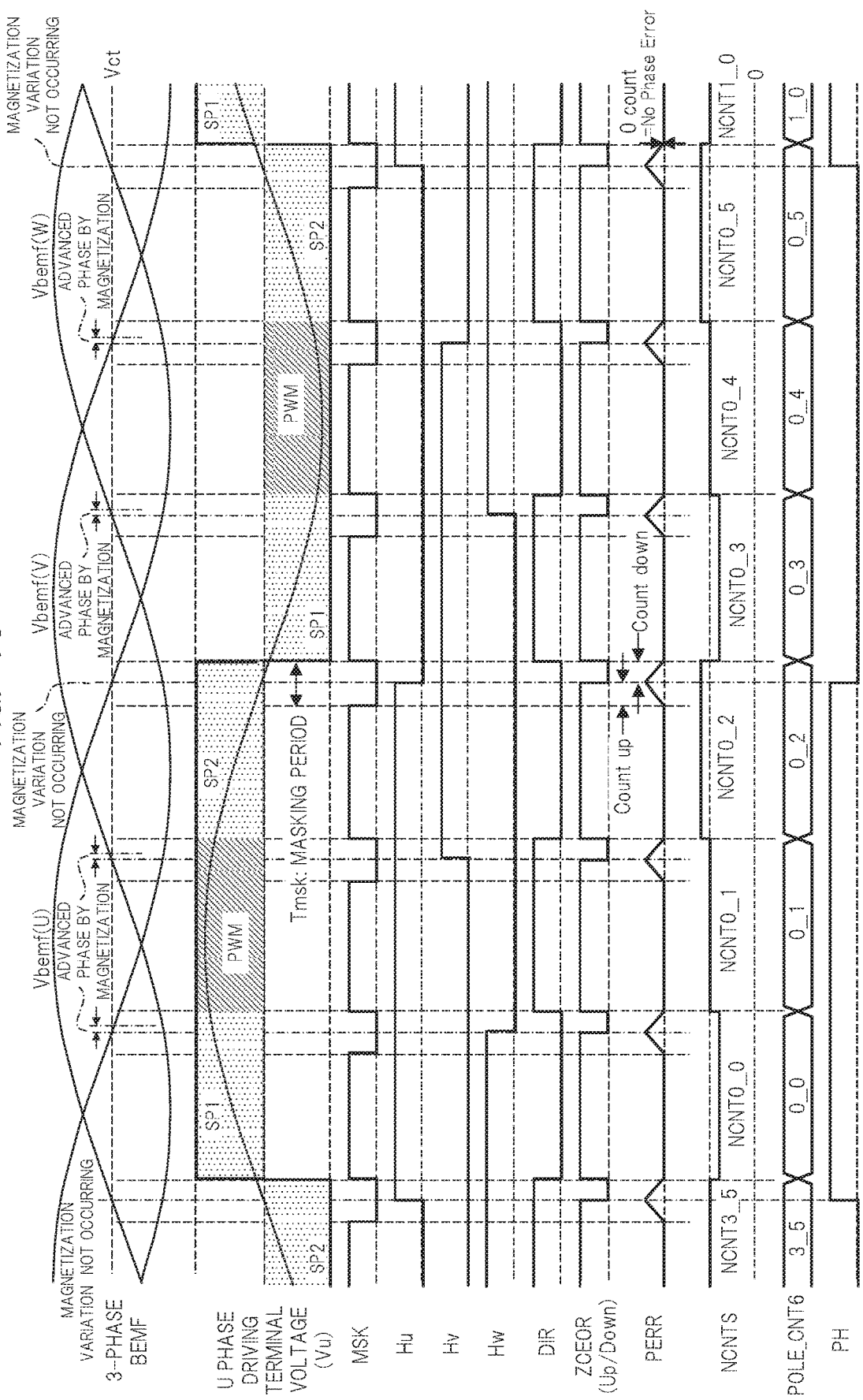
FIG. 16 is a timing chart illustrating an example of the operation of the motor driving apparatus of FIG. 14 and FIG. 15.

FIG. 15 is a block diagram showing a detailed configuration example around the PLL control loop in FIG. 14. FIG. 16 is a timing chart showing an example of the operation of the motor driving apparatus shown in FIGS. 14 and 15. In FIG. 15, the configuration of the phase error detection unit PHEDd is different from that in FIG. 3. The phase error detection unit PHEDd includes a zero crossing signal generation unit ZCG that receives the Hall signals Hu, Hv, Hw and the BEMF polarity signal DIR and generates a zero crossing EOR signal ZCEOR similar to that in FIG. 3 and an error counter ECUNT similar to that in FIG. 3.

As shown in FIG. 16, the Hall signals Hu, Hv and Hw are, ideally, rectangular wave signals each having a rising edge and a falling edge synchronized with the zero crossing timing of the three-phase back electromotive force Vbemf (U, V, W). The phase error detection unit PHEDd performs a logical operation on the Hall signals Hu, Hv and Hw and the BEMF polarity signal DIR to generate the zero crossing EOR signal ZCEOR similar to the zero crossing EOR signal in FIG. 6. Thus, the error counter ECUNT can detect the phase error PERR in the same manner as in FIG. 6. Although the phase position signal CNT6 is generated using the phase position counter CUNTph in FIG. 15, the phase position signal CNT6 can be generated by latching the decoding results of the Hall signals Hu, Hv and Hw with the phase switching signal COMM.

Here, the Hall signals Hu, Hv and Hw are ideally signals synchronized with the phase of the back electromotive force Vbemf (U, V, W). However, in the actual Hall signals Hu, Hv and Hw, as shown in FIG. 16, variation (i.e. magnetization variation) may occur with respect to the BEMF phase of the corresponding phase. For example, the phase of the v-phase Hall signals Hv is advanced of the phase of the v-phase back electromotive force Vbemf (V). Such variation in magnetization is caused by, for example, variation in mounting of the Hall element. The variation in magnetization causes rotational jitter in the same manner as in the first embodiment and the like. Therefore, as shown in FIG. 15, it is advantageous to use the same PI compensator PICPa as in FIG. 3 and the like.

As described above, by using the method of Embodiment 5, it is possible to obtain the various effects described in Embodiment 1 and the like in motor systems of various types and applications in which variation in magnetization can occur. In addition, if the rotational jitter can be reduced regardless of the magnetization variation, it is possible to manufacture various motors at low cost and consequently, it is possible to reduce the cost of the motor system and the like. The motor system is not limited to the HDD but includes a DVD playback/recording device, a Blu-ray playback/recording device and the like. Further, in some cases, it is also possible to apply the method of the embodiment as a technique for performing higher-precision control in an inverter system of an air conditioner or the like.

Although the invention made by the present inventor has been specifically described based on the embodiment, the present invention is not limited to the embodiment described above, and various modifications can be made without departing from the gist thereof. For example, the above-described embodiments have been described in detail in order to easily understand the present invention and are not necessarily limited to those having all the configurations described. In addition, a part of the configuration of one embodiment can be replaced with the configuration of another embodiment, and the configuration of another embodiment can be added to the configuration of one embodiment. It is also possible to add, delete, or replace some of the configurations of the respective embodiments.

What is claimed is:

1. A motor driving apparatus for controlling a targeted rotational phase for control so that a detected rotational phase obtained by detecting a rotational phase of a three-phase motor and the targeted rotational phase for control to determine a conduction timing of the three-phase motor are synchronized, the motor driving apparatus having
   a phase error detecting unit for detecting a plurality of phase errors between the detected rotational phase and the targeted rotational phase for control at each of a plurality of detection timings in a mechanical angular cycle that is a cycle of a mechanical angle of 360 degrees in the three-phase motor,
   a compensator for determining an amount of operation for bringing the plurality of phase errors closer to zero by taking the plurality of phase errors from the phase error detecting unit as an input and by reflecting state variables in the previous mechanical angular cycle so as to update the state variables, and
   an conduction timing generating unit for sequentially controlling the targeted rotational phase for control based on the amount of operation from the compensator,
   wherein the compensator
   determines the amount of operation corresponding to each of the plurality of detection timings in the previous mechanical angular cycle.

2. The motor driving apparatus according to claim 1, wherein the compensator
   has a plurality of registers corresponding to each of the plurality of detection timings,
   stores each of the state variables in corresponding each of the plurality of registers at each of the plurality of detection timings in the previous mechanical angular cycle and
   determines the amount of operation in the current mechanical angular cycle by reflecting the state variable stored in the corresponding each of the plurality of registers at each of the plurality of detection timings in the current mechanical angular cycle.

3. The motor driving apparatus according to claim 2, wherein the detected rotation phase is a phase of a back electromotive force of the three-phase motor, and
   wherein each of the plurality of detection timings is a timing of a rising zero crossing in which the back electromotive force crosses the middle of the amplitude of the back electromotive force the toward a high potential side, or each of the plurality of detection timings is a timing of a falling zero crossing in which the back electromotive force crosses the middle of the amplitude of the back electromotive force the toward a low potential side.

4. The motor driving apparatus of claim 3, wherein the plurality of detection timings include a timing of the rising zero crossings occurring three times in an electrical angular cycle having an electrical angle of 360 degrees and a timing of the falling zero crossings occurring three times in the electrical angular cycle.

5. The motor driving apparatus according to claim 3, wherein the three-phase motor is a "2×N" (N is an integer equal to or greater than 2) pole motor,
   the mechanical angular cycle includes N times an electrical angular cycle of 360 degrees, and
   the plurality of detection timings include at least one of a timing of the rising zero crossing occurring in each of the electrical angular cycles of the back electromotive force of any one phase in three phases, or a timing of the falling zero crossing occurring in each of the electrical angular cycles.

6. The motor driving apparatus according to claim 3, further comprising:
   a timing control unit that determines a plurality of reference timings synchronized with the targeted rotational phase for control at predetermined phase intervals within the mechanical angular cycle;
   controls a driving input terminal of the three-phase motor corresponding to the phase to be detected of the back electromotive force to a high impedance state at a predetermined phase interval including the plurality of the reference timings; and the phase error detection unit detects a phase error between the reference timing and the timing of the rising zero crossing occurring at the driving input terminal in the high impedance state or a phase error between the reference timing and the timing of the falling zero crossing occurring at the driving input terminal in the high impedance state.

7. The motor driving apparatus according to claim 6, wherein the timing control unit has a variable setting unit for variably setting the length of the predetermined phase interval.

8. The motor driving apparatus according to claim 6, wherein the timing control unit includes a high impedance releasing unit that releases the high impedance state when the timing of the rising zero crossing or the timing of the falling zero crossing occurs.

9. The motor driving apparatus according to claim 3, wherein the compensator operates in a first operation mode or a second operation mode, wherein
   in the first operation mode, the amount of operation is determined by using the corresponding one register for each of the plurality of detection timings, and
   in the second operation mode, the state variable for each of the plurality of detection timings is commonly stored in the plurality of registers, whereby the plurality of registers are regarded as one register to determine the amount of operation.

10. The motor driving apparatus of claim
    wherein the state variable is the amount of operation.

11. The motor driving apparatus according to claim 2, wherein the state variable is the amount of operation and the phase error, and
    the compensator has
    a plurality of first registers serving as the plurality of registers for storing the amount of operation and
    a plurality of second registers serving as the plurality of registers for storing the phase error.

12. The motor driving apparatus according to claim 2, wherein one of the plurality of registers is a reference register, and the compensator further comprises:
a subtractor for calculating a difference value between the state variable updated at each of the plurality of detection timings and the state variable stored in the reference register, and for storing the difference value in the corresponding one register excluding the reference register; and
an adder for adding the difference value from the corresponding one register excluding the reference register and the state variable stored in the reference register.

13. The motor driving apparatus according to claim 2, wherein the detected rotational phase is a phase of a three-phase position detection signal from a position sensor attached to the three-phase motor, and each of the plurality of detection timings is a timing of a rising edge or a timing of a falling edge of the three-phase position detection signal.

14. A motor system comprising:
a disk for storing data;
a three-phase motor for rotating the disk;
a motor driving apparatus for controlling
a targeted rotational phase for control so that a detected rotational phase obtained by detecting a rotational phase of a three-phase motor and the targeted rotational phase for control to determine a conduction timing of the three-phase motor are synchronized
wherein the motor driving apparatus has:
a phase error detecting unit for detecting a plurality of phase errors between the detected rotational phase and the targeted rotational phase for control at each of a plurality of detection timings in a mechanical angular cycle that is a cycle of a mechanical angle of 360 degrees in the three-phase motor,
a compensator for determining an amount of operation for bringing the plurality of phase errors closer to zero by taking the plurality of phase errors from the phase error detecting unit as an input and by reflecting state variables in the previous mechanical angular cycle so as to update the state variables, and
a conduction timing generating unit for sequentially controlling the targeted rotational phase for control based on the amount of operation from the compensator,
wherein the compensator
determines the amount of operation corresponding to each of the plurality of detection timings in the previous mechanical angular cycle.

15. The motor system of claim 14,
wherein the compensator
has a plurality of registers corresponding to each of the plurality of detection timings,
stores each of the state variables in corresponding each of the plurality of registers at each of the plurality of detection timings in the previous mechanical angular cycle and
determines the amount of operation in the current mechanical angular cycle by reflecting the state variable stored in the corresponding each of the plurality of registers at each of the plurality of detection timings in the current mechanical angular cycle.

16. The motor system of claim 15,
wherein the detected rotation phase is a phase of a back electromotive force of the three-phase motor, and
wherein each of the plurality of detection timings is a timing of a rising zero crossing in which the back electromotive force crosses the middle of the amplitude of the back electromotive force the toward a high potential side, or each of the plurality of detection timings is a timing of a falling zero crossing in which the back electromotive force crosses the middle of the amplitude of the back electromotive force the toward a low potential side.

17. The motor system of claim 16,
wherein the three-phase motor is a "2×N" (N is an integer equal to or great than 2)" pole motor,
the mechanical angular cycle includes N times an electrical angular cycle of 360 degrees, and
the plurality of detection timings include at least one of a timing of the rising zero crossing occurring in each of the electrical angular cycles of the back electromotive force of any one phase in three phases,
or a timing of the falling zero crossing occurring in each of the electrical angular cycles.

18. The motor system according to claim 16,
a timing control unit that determines a plurality of reference timings synchronized with the targeted rotational phase for control at predetermined phase intervals within the mechanical angular cycle;
controls a driving input terminal of the three-phase motor corresponding to the phase to be detected of the back electromotive force to a high impedance state at a predetermined phase interval including the plurality of the reference timings; and the phase error detection unit detects a phase error between the reference timing and the timing of the rising zero crossing occurring at the driving input terminal in the high impedance state or a phase error between the reference timing and the timing of the falling zero crossing occurring at the driving input terminal in the high impedance state.

19. The motor system of claim 16,
wherein the compensator operates in a first operation mode or a second operation mode,
wherein
in the first operation mode, the amount of operation is determined by using the corresponding one register for each of the plurality of detection timings, and
in the second operation mode, the state variable for each of the plurality of detection timings is commonly stored in the plurality of registers, whereby the plurality of registers are regarded as one register to determine the amount of operation.

20. The motor system of claim 15,
wherein the state variable is the amount of operation and the phase error, and
the compensator has
a plurality of first registers serving as the plurality of registers for storing the amount of operation and
a plurality of second registers serving as the plurality of registers for storing the phase error.

* * * * *